(12) United States Patent
Wang et al.

(10) Patent No.: US 12,063,176 B2
(45) Date of Patent: Aug. 13, 2024

(54) ULTRA-RELIABLE LOW-LATENCY COMMUNICATION INDICATION CHANNELIZATION DESIGNS

(71) Applicant: QUALCOMM Incorporated, San Diego, CA (US)

(72) Inventors: Renqiu Wang, San Diego, CA (US); Jing Jiang, San Diego, CA (US); Hao Xu, Beijing (CN); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/209,194

(22) Filed: Mar. 22, 2021

(65) Prior Publication Data

US 2021/0281375 A1    Sep. 9, 2021

Related U.S. Application Data

(63) Continuation of application No. 15/917,566, filed on Mar. 9, 2018, now Pat. No. 10,958,394.

(Continued)

(51) Int. Cl.
*H04L 5/00* (2006.01)
*H04W 72/12* (2023.01)
(Continued)

(52) U.S. Cl.
CPC .......... *H04L 5/0051* (2013.01); *H04L 5/0044* (2013.01); *H04L 5/0055* (2013.01);
(Continued)

(58) Field of Classification Search
None
See application file for complete search history.

(56) References Cited

U.S. PATENT DOCUMENTS 10,225,826 B2   3/2019   Tiirola et al.
10,523,391 B2   12/2019  Lim et al.
(Continued)

FOREIGN PATENT DOCUMENTS

CN   104854813 A    8/2015
CN   106105087 A   11/2016
(Continued)

OTHER PUBLICATIONS

Ericsson: "On eMBB/URLLC Multiplexing for Downlink", 3GPP Draft, 3GPP TSG-RAN WG1 #88, R1-1701869, 3rd Generation Partnership Project (3GPP), Mobile Competence Centre, 650, Route Des Lucioles, F-06921, Sophia-Antipolis Cedex, France, vol. RAN WG1, Athens, Greece, Feb. 13, 2017-Feb. 17, 2017, Feb. 6, 2017 (Feb. 6, 2017), XP051220653, 5 pages, Retrieved from the Internet: URL: http://www.3gpp.org/ftp/tsg_ran/WG1_RL1/TSGR1_88/Docs/ [retrieved on Feb. 6, 2017].

(Continued)

*Primary Examiner* — Steve R Young
(74) *Attorney, Agent, or Firm* — Arent Fox, LLP

(57) ABSTRACT

In some circumstances, a URLLC may preempt resource. An apparatus may be configured to receive a set of resource blocks from a base station including at least one of eMBB data or URLLC data in a PDSCH. The apparatus may receive a URLLC indicator from the base station. The URLLC indicator may be received embedded within the URLLC data or received separate from the URLLC data within DCI of a PDCCH. The URLLC indicator indicates whether the set of resource blocks includes at least part of the URLLC data. The apparatus may determine, based on the URLLC indicator, whether the set of resource blocks includes the URLLC data and processing the set of resource blocks based on a result of determining whether the set of resource blocks includes the URLLC data.

31 Claims, 25 Drawing Sheets

Related U.S. Application Data

(60) Provisional application No. 62/470,075, filed on Mar. 10, 2017.

(51) Int. Cl.
*H04W 72/14* (2009.01)
*H04W 72/23* (2023.01)
*H04W 72/566* (2023.01)
*H04W 72/0446* (2023.01)
*H04W 72/543* (2023.01)

(52) U.S. Cl.
CPC ........... *H04L 5/0096* (2013.01); *H04W 72/23* (2023.01); *H04W 72/569* (2023.01); *H04W 72/0446* (2013.01); *H04W 72/543* (2023.01)

(56) References Cited

U.S. PATENT DOCUMENTS

| | | | |
|---|---|---|---|
| 2013/0163535 | A1 | 6/2013 | Anderson et al. |
| 2016/0113008 | A1 | 4/2016 | Damnjanovic et al. |
| 2017/0359807 | A1* | 12/2017 | Hong ................ H04W 72/0446 |
| 2018/0027576 | A1* | 1/2018 | Kowalski .......... H04W 72/0446 370/329 |
| 2018/0063749 | A1* | 3/2018 | Islam ..................... H04L 1/1893 |
| 2018/0063865 | A1* | 3/2018 | Islam ..................... H04L 5/0091 |
| 2018/0070341 | A1* | 3/2018 | Islam ..................... H04L 5/0064 |
| 2018/0083750 | A1* | 3/2018 | Li ........................... H04L 1/1819 |
| 2018/0139773 | A1* | 5/2018 | Ma ..................... H04L 27/26025 |
| 2018/0167164 | A1* | 6/2018 | Lin ....................... H04L 1/0042 |
| 2018/0262311 | A1 | 9/2018 | Wang et al. |
| 2019/0090239 | A1 | 3/2019 | Damnjanovic et al. |
| 2019/0268930 | A1* | 8/2019 | Rudolf ................ H04W 72/569 |
| 2019/0334659 | A1 | 10/2019 | Ye et al. |
| 2019/0357224 | A1 | 11/2019 | Li et al. |
| 2020/0305137 | A1* | 9/2020 | Lu ......................... H04L 5/0053 |
| 2020/0314860 | A1 | 10/2020 | Zhou et al. |

FOREIGN PATENT DOCUMENTS

| | | |
|---|---|---|
| GB | 2558564 B | 7/2018 |
| JP | 2013176008 A | 9/2013 |
| JP | 2013207586 A | 10/2013 |
| WO | 2015148076 | 10/2015 |
| WO | 2016185747 A1 | 11/2016 |
| WO | 2018129319 A1 | 7/2018 |

OTHER PUBLICATIONS

Guangdong OPPO Mobile Telecom: "DL Control Channel Design for URLLC", R1-1701963, 3GPP tsg_ran\WG1_RL1, 3GPP TSG RAN WG1 Meeting #88, Athens, Greece Feb. 13-17, 2017, Feb. 6, 2017, 4 Pages.
Samsung: "DL Control Channel for URLLC", 3GPP TSG RAN WG1 Meeting #88, R1-1702997, Athens, Greece, Feb. 13-17, 2017, 4 Pages.
Wilus Inc., "Consideration on DL Control and Data Channel for URLLC", R1-1703031, 3GPP tsg_ran\WG1_RL1, 3GPP TSG RAN WG1 Meeting #88, Athens, Greece, Feb. 13-17, 2017, 6 Pages.
Huawei, et al., "DL Control and Data Channel Reliability Considerations for URLLC", 3GPP TSG RAN WG1 #88 R1-1701664, Athens, Greece, Feb. 13, 2017, Feb. 13, 2017-Feb. 17, 2017, 9 Pages, Feb. 6, 2017.
Interdigital Communications: "Design Considerations for Mini-Slots", 3GPP TSG RAN WG1 adhoc_NR_AH_1701, R1-1700853, Spokane, USA, Jan. 16, 2017-Jan. 20, 2017, 5 Pages, Jan. 10, 2017.
Taiwan Search Report—TW107108247—TIPO—Sep. 17, 2021.
Institute for Information Industry (III): "On eMBB and URLLC Multiplexing in Uplink", 3GPP Draft; R1-1702295 On EMBB and URLLC Multiplexing in Uplink, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), pp. 1-6, XP051209449, Retrieved from the Internet: URL: http://www.3gpp.org/ftp/Meetings_3GPP_SYNC/RAN1/Docs/ [retrieved on Feb. 12, 2017].
LG Electronics: "New WI Proposal: URLLC Support in LTE", 3GPP TSG RAN Meeting #75, RP-170242, Dubrovnik, Croatia, Mar. 6-9, 2017, 4 Pages.
Sequans Communications: "On Dynamic Resource Sharing Between URLLC and eMBB in DL" [online], 3GPP Draft, 3GPP TSG RAN WG1 AH_NR Meeting, R1-1700642—On Dynamic DL Resource Sharing Between URLLC and EMBB, 3rd Generation Partnership Project (3GPP), Mobile Competence Centre, 650, Route Des Lucioles, F-06921 Sophia-Antipolis, vol. RAN WG1, No. Spokane, USA, Jan. 16, 2017-Jan. 20, 2017, Jan. 16, 2017 (Jan. 16, 2017), XP051208167, 6 Pages, Retrieved from the Internet: URL: http://www.3gpp.org/ftp/Meetings_3GPP_SYNC/RAN1/Docs/ [retrieved on Jan. 16, 2017].
ZTE, et al., "About URLLC and eMBB Multiplexing in Downlink" [online], 3GPP Draft, R1-1700264, 3GPP TSG RAN WG1 AH_NR Meeting, 3rd Generation Partnership Project (3GPP), Mobile Competence Centre, 650, Route Des Lucioles, F-06921, Sophia-Antipolis Cedex, France, vol. RAN WG1, Spokane, USA, Jan. 16, 2017-Jan. 20, 2017, Jan. 10, 2017 (Jan. 10, 2017), XP051202767, pp. 1-10, Retrieved from the Internet: URL: http://www.3gpp.org/ftp/tsg_ran/WG1_RL1/TSGR1_AH/NR_AH_1701/Docs/ [retrieved on-Jan. 10, 2017], Section 2.1.2, Section 2.2.
International Preliminary Report on Patentability—PCT/US2018/021887, the International Bureau of WIPO—Geneva, Switzerland, Sep. 19, 2019.
International Search Report and Written Opinion—PCT/US2018/021887—ISA/EPO—Jun. 13, 2018.
Nokia, et al., "On Indication for Downlink Punctured/Preemptive Scheduling", 3GPP TSG-RAN WG1 #88, 3GPP Draft; R1-1703327_Punctured Scheduling_Final, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), 4 Pages, XP051210457, Retrieved from the Internet: URL: http://www.3gpp.org/ftp/Meetings_3GPP_SYNC/RAN1/Docs/.
Qualcomm Incorporated: "DL URLLC/eMBB Dynamic Multiplexing and Indication Design", 3GPP Draft; R1-1702639 DL URLLCEMBB Dynamic Multiplexing and Indication Design, 3rd Generation Partnership Project (3GPP), Mobile Competence Centre; 650, Route Des Lucioles; F-06921 Sophia-Antipolis, vol. RAN WG1, No. Athens, Greece; Feb. 13, 2017-Feb. 17, 2017, Feb. 12, 2017 (Feb. 12, 2017), 9 Pages, XP051209790, Retrieved from the Internet: URL: http://www.3gpp.org/ftp/Meetings_3GPP_SYNC/RAN1/Docs/ [retrieved on Feb. 12, 2017].
Sony et al., "Considerations on using Indicator in Dynamic DL Resource Sharing between URLLC & eMBB", 3GPP Draft; R1-1703122—REL-14 NR-URLLC Corruption Indicator in EMBB V11 , 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017, XP051210260, Retrieved from the Internet: URL;http://www.3gpp.org/ftp/Meetings_3GPP_SYNC/RAN1/Docs/ [retrieved on Feb. 12, 2017], 5 pages.
European Search Report—EP22197834—Search Authority—The Hague—Dec. 16, 2022.
Intel Corporation: "Aspects of Reference Signal Design for URLLC services", 3GPP TSG RAN WG1 Meeting #87, R1-1612581 Intel—URLLC REFSIG, 3rd Generation Partnership Project, Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, 7 Pages, XP051176526, section 3.
Sequans Communications: "Preemption-Based Multiplexing of URLLC and eMBB in DL", 3GPP TSG RAN WG1 Meeting #88, R1-1702117, Preemption-Based Multiplexing of URLLC and EMBB in DL, 3rd Generation Partnership Project, Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017, XP051209277, 5 Pages, Section 2.

(56) References Cited

OTHER PUBLICATIONS

Taiwan Search Report—TW111136034—TIPO—Nov. 16, 2022.
Samsung: "Summary of e-mail Discussions on Multiplexing eMBB and URLLC in DL", 3GPP TSG RAN WG1 adhoc_NR_AH1701, TSG RAN WG1 NR Ad-hoc Meeting, R1-1700972, 3rd Generation Partnership Project, Mobile Competence Centre,650, Route Des Lucioles, F-0692, vol. RAN WG1, No. Spokane, USA, Jan. 16, 2017-Jan. 20, 2017, Jan. 16, 2017, 23 Pages, XP051208487, pp. 4-13, 2.1 Indication of preempted or impacted eMBB resources to corresponding eMBB UE(s), Section 2, Appendix 2.

\* cited by examiner

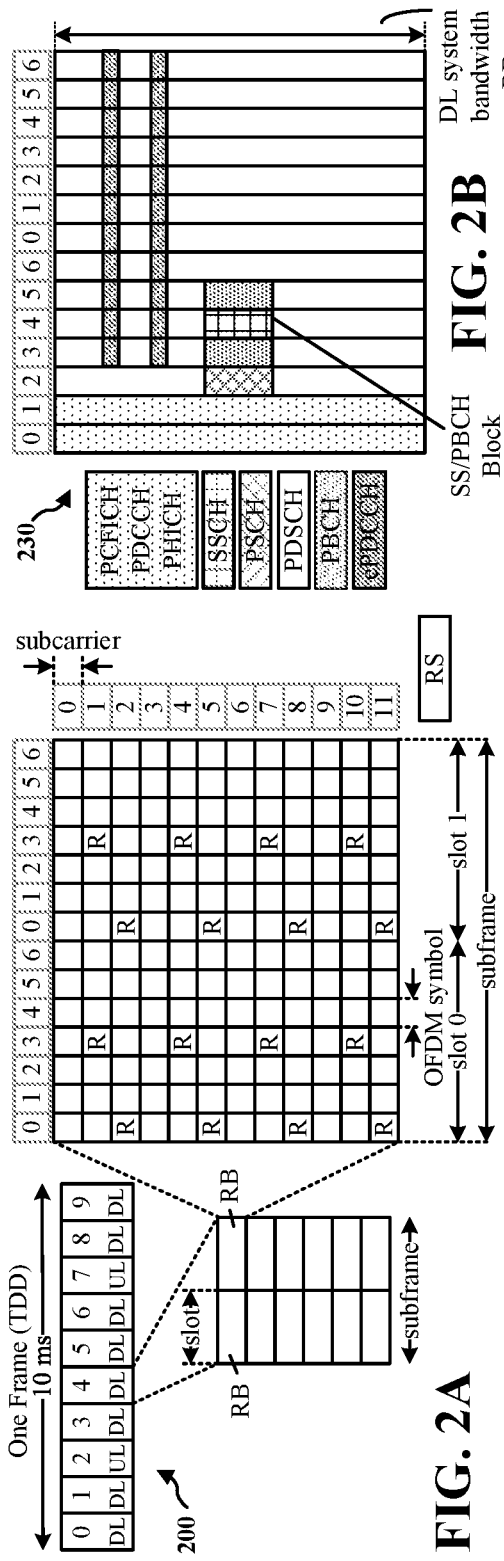
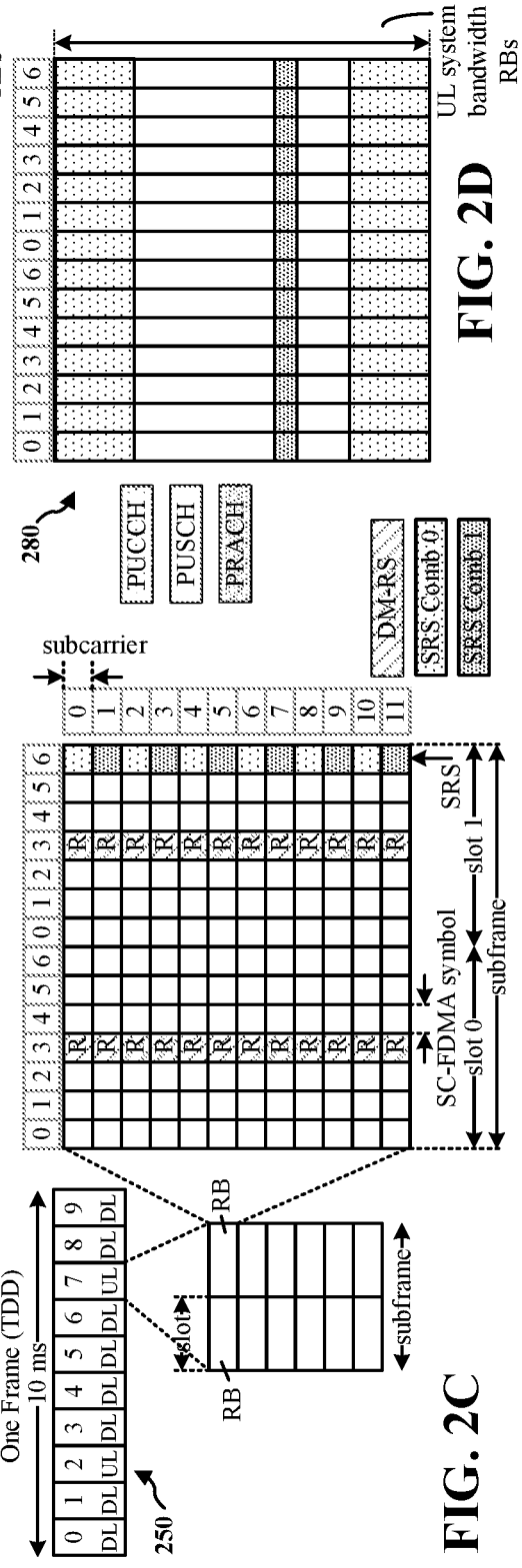

ULTRA-RELIABLE LOW-LATENCY COMMUNICATION INDICATION CHANNELIZATION DESIGNS

CROSS-REFERENCE TO RELATED APPLICATION(S)

This application is a Continuation of U.S. application Ser. No. 15/917,566, entitled "ULTRA-RELIABLE LOW-LATENCY COMMUNICATION INDICATION CHANNELIZATION DESIGNS" and filed on Mar. 9, 2018 which claims the benefit of U.S. Provisional Application Ser. No. 62/470,075, entitled "ULTRA-RELIABLE LOW-LATENCY COMMUNICATION INDICATION CHANNELIZATION DESIGNS" and filed on Mar. 10, 2017, both of which are expressly incorporated by reference herein in their entirety.

BACKGROUND

Technical Field

The present disclosure relates generally to communication systems, and more particularly, to systems, methods, and devices that provide an indication of an occurrence of an ultra-reliable low-latency communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some circumstances, an ultra-reliable low-latency communication (URLLC) may preempt or puncture resources occupied by, for example, an ongoing enhanced mobile broadband (eMBB) communication. Accordingly, some devices may send a URLLC indicator indicating that the URLLC data is within an eMBB data. Other devices may receive a URLLC indicator indicating that the URLLC data is within an eMBB data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, in some circumstances, a URLLC may preempt or puncture a resource occupied by, for example, an ongoing eMBB communication. For example, the URLLC may take the place of a portion of eMBB data in the, for example, ongoing eMBB communication. In an alternate example, the URLLC data may be sent at the same time as a portion of eMBB data, puncturing the portion of eMBB data, in the ongoing eMBB communication.

Accordingly, some devices (e.g., a base station or a UE) may send a URLLC indicator indicating that the URLLC data is sent on shared channel resources which may include eMBB data. Other devices (e.g., a UE or a base station) may receive a URLLC indicator indicating that the URLLC data is sent on the shared channel and may puncture or preempt the eMBB data.

In an aspect of the disclosure, a method, a computer-readable medium, and an apparatus are provided. The apparatus may be a base station configured to generate a set of resource blocks including at least one of eMBB data or URLLC data in a physical downlink shared channel (PDSCH). The base station may be configured to generate a URLLC indicator indicating whether the set of resource blocks includes at least part of the URLLC data. The base station may be configured to send, to at least one user equipment (UE), the URLLC indicator and the set of resource blocks including the at least one of the eMBB data or the URLLC data. The URLLC indicator being sent embedded within the URLLC data or being sent separate from the URLLC data within downlink control information (DCI) of a physical downlink control channel (PDCCH).

In another aspect of the disclosure, a method, a computer-readable medium, and an apparatus are provided. The apparatus may be a UE configured to receive a set of resource blocks from a base station comprising at least one of eMBB data or URLLC data in a PDSCH. The UE may be configured to receive a URLLC indicator from the base station. The URLLC indicator may be received embedded within the URLLC data or being received separate from the URLLC data within DCI of a PDCCH. The URLLC indicator may indicate whether the set of resource blocks includes the URLLC data. The UE may be configured to determine, based on the URLLC indicator, whether the set of resource blocks includes the URLLC data. The UE may be configured to processing, based on the URLLC indicator, the received set of resource blocks including the at least one of the eMBB data or the URLLC data.

In another aspect of the disclosure, a method, a computer-readable medium, and an apparatus are provided. The apparatus may be a UE configured to generate a set of resource blocks including URLLC data, generate a URLLC indicator in a group-common DCI message indicating that the URLLC data is in a subset of the set of resource blocks and is within the PUSCH for eMBB data, and sending, to a base station, the URLLC indicator and the set of resource blocks including the URLLC data.

In another aspect of the disclosure, a method, a computer-readable medium, and an apparatus are provided. The apparatus may be a base station configured to receive a set of resource blocks from a UE. The UE may also be configured to receive a URLLC indicator from the base station (gNB). Additionally, the UE may be configured to determine, based on the URLLC indicator, that a subset of the set of resource blocks includes or does not include URLLC data.

In another aspect of the disclosure, a method, a computer-readable medium, and an apparatus are provided. The apparatus may be a UE configured to transmit, to a base station, a URLLC indicator indicating a set of uplink (UL) URLLC resources for transmitting URLLC data. The UE may also be configured to generate a set of resource blocks including URLLC data. Additionally, the UE may be configured to send, to the base station, the set of resource blocks including the URLLC data within the indicated set of UL URLLC resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
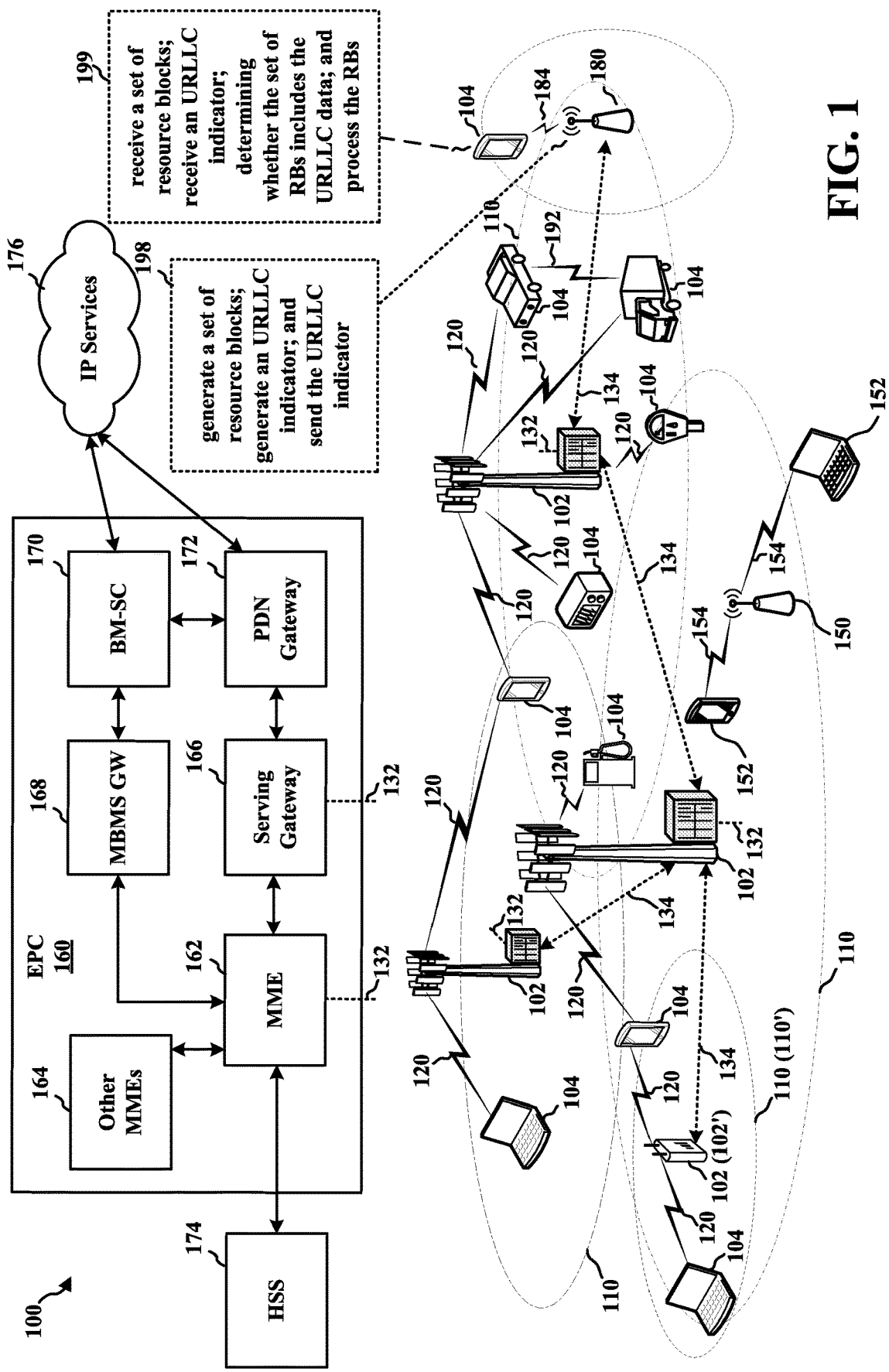
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various aspects of the systems and methods described herein relate to uplink or downlink indications. The uplink or downlink indications may be URLLC indications, i.e., a URLLC indicator. Accordingly, in some aspects, the URLLC indicator may be an uplink URLLC indicator and in other aspects, the URLLC indicator may be a downlink URLLC indicator. The downlink indicator may be transmitted from a base station to a UE. The uplink indicator may be transmitted from a UE to a base station. In an aspect, a downlink indicator may be in DCI of a group common PDCCH. A downlink indicator may be a post indication, e.g., appearing at the start of a next slot. Additionally, a downlink indicator may be configured to be a wideband indication or a sub-band indication (e.g., up to 2 sub-bands) indication. For example, the downlink indicator may indicate that a URLCC will preempt or puncture an entire band, which may be referred to as wideband or preempt or puncture a sub-band, which may be referred to as sub-band. In some instances, the downlink indicator may indicate that a URLCC will preempt or puncture an entire band, while the actual data send may not take up the entire band. Furthermore, a downlink indicator may be configured to indicate one or more symbols by configuring the monitoring periodicity. In an aspect, a uplink indicator may use one or more of the formats described herein with respect to downlink indicators. In some aspects, a downlink indicator may be a current indication, e.g., appearing in the same symbols or mini-slots as the URLLC data. In one example, the indicator may be embedded in the URLLC data. In another example, the indicator may be separate from the URLLC data. In some aspects, a downlink indicator may be a pre-indication, e.g., appearing before the URLLC data. In one example, the indicator may be transmitted in the beginning of the slot, e.g., in DCI of a group common PDCCH followed by the URLLC data.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be configured to generate a set of resource blocks including at least one of eMBB data or URLLC data in a PDSCH. The base station 102 may also be configured to generate a URLLC indicator indicating whether the set of resource blocks includes at least part of the URLLC data. Additionally, the base station 102 may be configured to send, to at least one user equipment (UE), the URLLC indicator and the set of resource blocks including the at least one of the eMBB data or the URLLC data, the URLLC indicator being sent embedded within the URLLC data or being sent separate from the URLLC data within downlink control information (DCI) of a physical downlink control channel (PDCCH) (198).

Accordingly, the UE 104 may be configured to receive a set of resource blocks from a base station comprising at least one of eMBB data or URLLC data in a PDSCH. The UE 104 may also be configured to receiving a URLLC indicator from the base station, the URLLC indicator being received embedded within the URLLC data or being received separate from the URLLC data within DCI of a PDCCH, the URLLC indicator indicating whether the set of resource blocks includes at least part of the URLLC data. When the URLLC data is embedded in the eMBB data, the URLLC may preempt eMBB transmissions on the same resources such that only the URLLC data is transmitted on the embedded resource and eMBB transmissions are omitted or canceled. In addition, the UE 104 may determine, based on the URLLC indicator, whether the set of resource blocks includes the URLLC data and processing the set of resource blocks based on a result of determining whether the set of resource blocks includes the URLLC data (199).

From the perspective of a URLLC device, generally, the URLLC device may not know or may not care about other UEs' (e.g., eMBB UEs) transmissions on PUSCH or PDSCH. Rather, a URLLC device may provide an indication that the URLLC device is prepared to transmit URLLC data on resources indicated by the URLLC indicator irrespective of other transmissions that may occupy those resources and which may be scheduled or ongoing. In an aspect, when a base station transmits a URLLC indicator, no scheduling is used. In another aspect, a UE may be the URLLC device, but the base station may be used to transmit a URLLC indication.

From the perspective of an eMBB UE, the eMBB UE may have to deal with transmissions on PUSCH from the URLLC device or transmissions to the URLLC device on PDSCH. The URLLC device may simply provide an indication that the URLLC device is prepared to transmit URLLC data on indicated resources. The URLLC device may be a URLLC UE or a URLLC base station. Downlink interruptions due to URLLC data may be signaled by a downlink URLLC indicator. In this case, if the URLLC data occupies resources that are allocated to an eMBB UE (i.e., when the URLLC data is embedded in the eMBB data), the eMBB UE may decode a DL transmission based on this information. For example, the eMBB UE may determine that the URLLC data punctures its DL transmission and may perform decoding of the DL transmission punctured with URLLC based on this determination (e.g., zeroing bits indicated as URLLC data). On the uplink, using the URLLC indicator, the eMBB UE may rate match its transmission of eMBB data around the resources occupied by URLLC data sent from an base station.

In an example, a URLLC device may identify the availability of mini-slots for transmission of URLLC data in a set of one or more resource blocks. The URLLC device may generate a first transmission on a PUSCH including URLLC data in at least one of the mini-slots. The URLLC device may generate a second transmission comprising a URLLC indicator to signal the presence of the URLLC data in the at least one mini-slot. The URLLC device may send the first and second transmissions in the set of one or more resource blocks.

In an aspect, URLLC data may be transmitted in an uplink mini-slot which may be dynamically or semi-statically configured and which is identified to the base station by the URLLC indicator.

In an aspect, a URLCC device may send an indicator of URLLC data. The indicator of the URLLC data may, in some examples, be sent regardless of whether URLLC data is present or not. For example, the URLLC indicator may indicate that URLLC data is present and where the URLLC data is located in a transmission. The URLLC indicator may also indicate that no URLLC data is present in a particular transmission. Thus, a URLLC device may transmit a URLLC indicator to another device, such as an eMBB UE. The other device may be required to monitor for the URLLC indicator to determine if URLCC data is present and to then take appropriate action when the URLLC data is present. For example, an eMBB UE may rate match around the URLLC data or zero out any received URLLC data base on the existence of URLLC data as may be indicated by the URLCC indicator. In a case when the URLCC indicator indicates that no URLLC data, the other device may do nothing. For example, the eMBB UE will not be required to rate match any transmitted data around URLCC data or zero out any received data. In other examples, URLLC indicators might be sent only when URLLC data is present.

In some aspects, an indicator may be sent regardless of the presence of URLLC data. For example, a URLLC indicator may be sent periodically. In other aspects, a URLLC indicator may be sent only when URLLC data is present.

In some aspects, an indicator may be received regardless of the presence of URLLC data. For example, a URLLC indicator may be received periodically (having been sent periodically by a URLLC device). In other aspects, a URLLC indicator may be received only when URLLC data is present.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries DCI within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The PDSCH carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
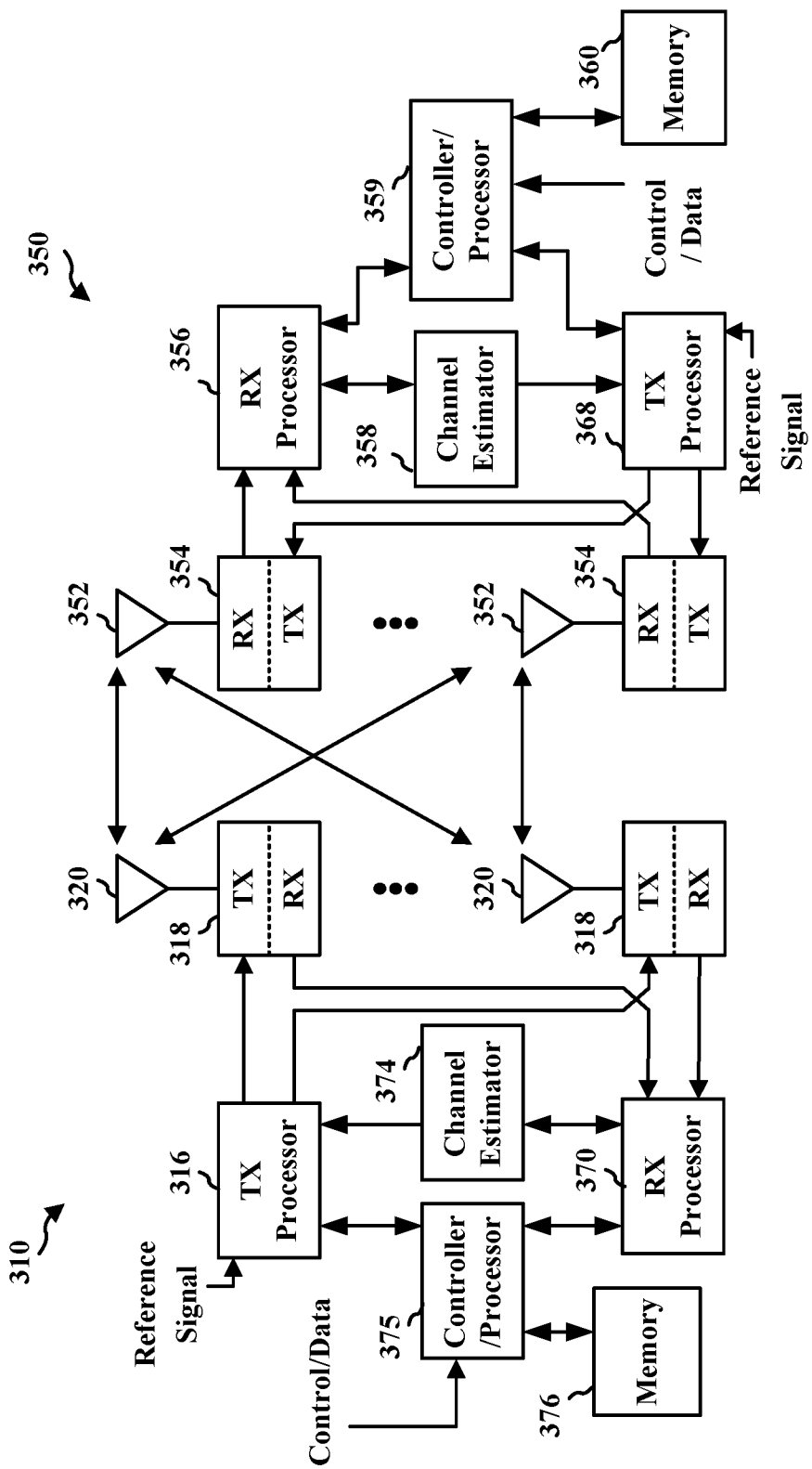
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. In an aspect, an RRC configuration may be used by the UE to monitor for the GC-DCI.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
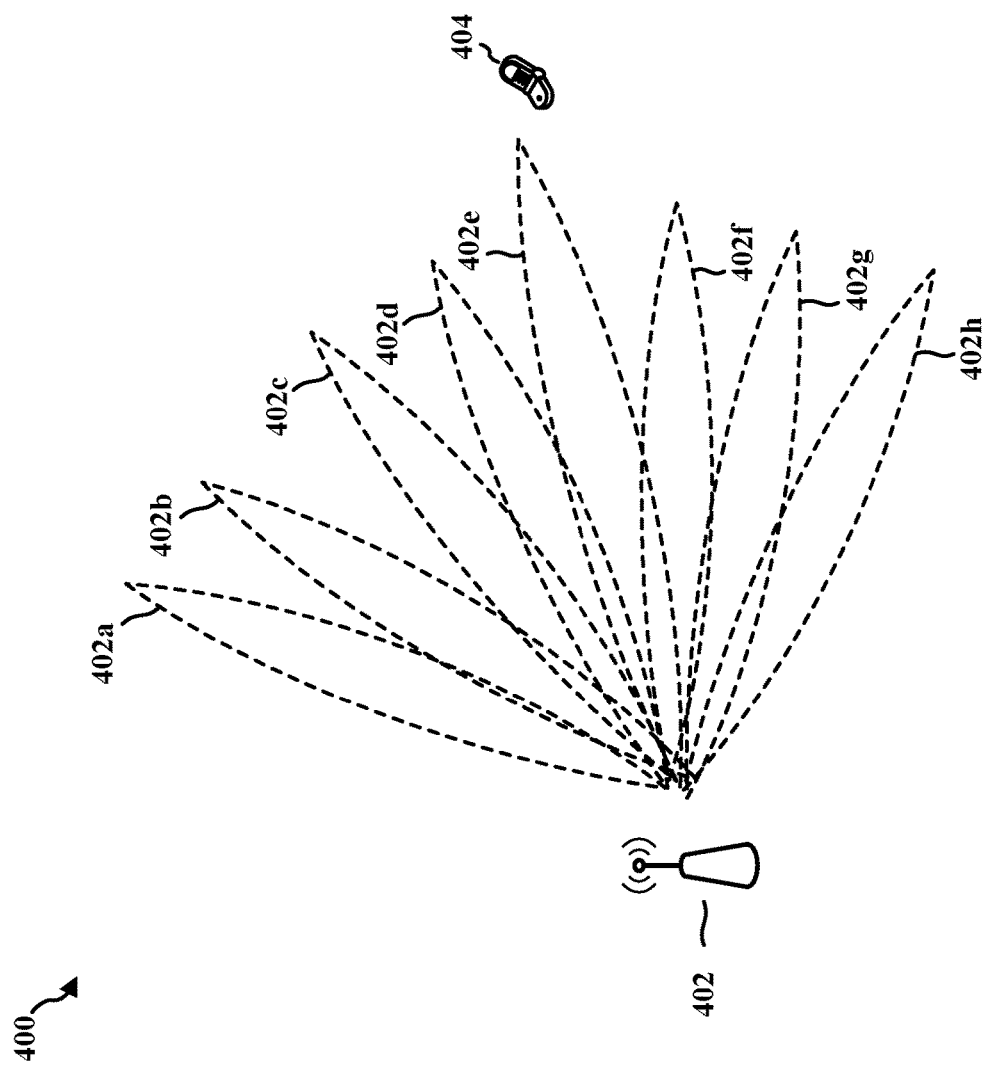
FIG. 4 is a diagram illustrating a base station in communication with a UE.

FIG. 4 is a diagram 400 illustrating a base station 402 in communication with a UE 404. Referring to FIG. 4, when the UE 404 turns on, the UE 404 searches for a nearby NR network. The UE 404 discovers the base station 402, which belongs to an NR network. The base station 402 transmits an SS block including the PSS, SSS, and the PBCH (including the MIB) periodically in different transmit directions 402*a*-402*h*. The UE 404 receives the transmission 402*e* including the PSS, SSS, and PBCH. Based on the received SS block, the UE 404 synchronizes to the NR network and camps on a cell associated with the base station 402.

In an aspect, a downlink indicator may be in DCI. For example, the indicator may be part of control information (e.g., DCI). Uplink indicators may use a corresponding method or a corresponding method of any of the systems and methods described herein.

A downlink indicator may be a post indication, e.g., appearing at the start of a next slot. The post indication may indicate whether the URLCC data is present or not at the slot before the indication.

In an aspect, a downlink indicator may be configured to be a wideband indication or a sub-band indication (e.g., up to 2 sub-bands) indication. Accordingly, in some aspects, the downlink indicator may spread across a wide portion of a bandwidth. In other aspects, the downlink indicator may be part of a sub-band.

Furthermore, a downlink indicator may be configured to indicate one or more symbols by configuring the monitoring periodicity. For example, a downlink indicator may be configured to indicate one or more symbols in a mini-slot or an indicator may be sent every predetermined number of mini-slots. Periodicity may be configured semi-statically or dynamically. Accordingly, in an aspect, periodicity may be configured semi-statically, e.g., the periodicity may be fairly fixed, but might be configurable when updated or some other period. In another aspect, periodicity may be configured dynamically, e.g., periodicity may be configured at any time or almost any time by a network to which a UE or base station is attached.

Figure 5:
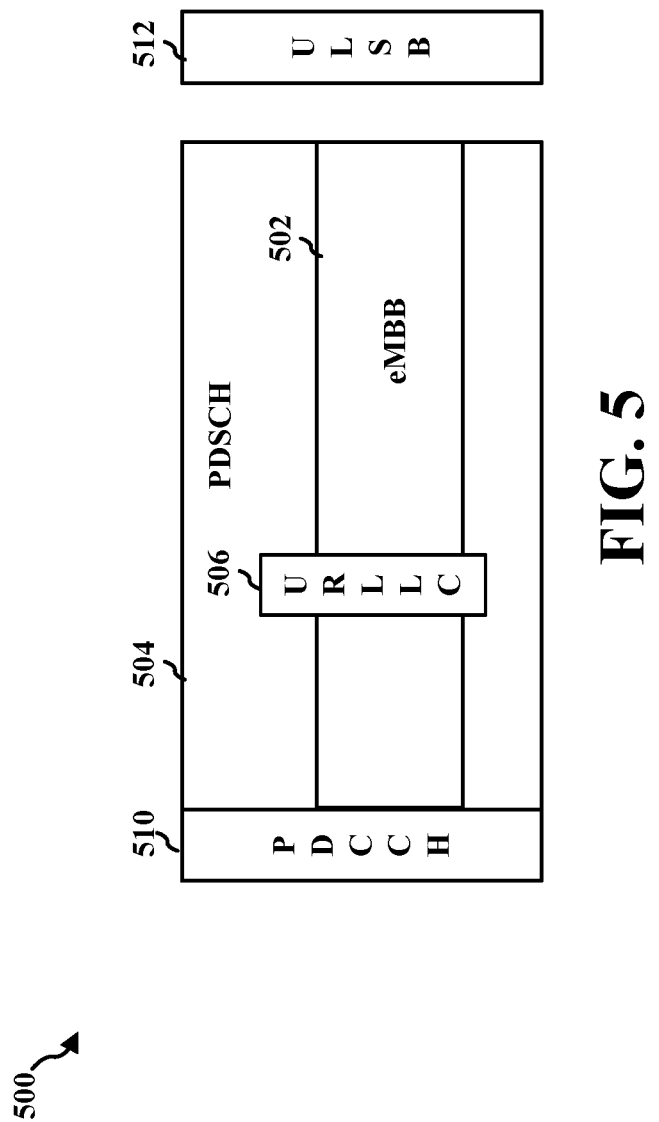
FIG. 5 is a diagram illustrating an example of a DL frame structure.

FIG. 5 is a diagram illustrating an example of a DL frame structure 500. The DL frame structure 500 includes eMBB data 502 and URLLC data 506 in a PDSCH 504. DL frame structure 500 further includes PDCCH 510, and uplink short burst (ULSB) 512 portions. The URLLC data 506 and the eMBB data 502 may be transmitted based on different transmission durations. For example, the eMBB data 502 may follow a long format (e.g., slot based). The URLLC data 506 may follow a short format (e.g., mini-slot based).

In a first radio access network (RAN1), dynamic resource sharing between URLLC data 506 and eMBB data 502 may be supported. Accordingly, the allocation of resources for the URLLC data 506 and the eMBB data 502 may be changed dynamically. For example, the URLLC data 506 may preempt or puncture a subset of resources occupied by on-going eMBB data 502. When the URLLC data 506 preempts resources occupied by on-going eMBB data 502, the URLLC data 506 may replace the overlapping resources occupied by on-going eMBB data 502, e.g., the base station may transmit URLLC data 506 instead of transmitting eMBB data 502 on the indicted PDSCH 504 resources. When the URLLC data 506 punctures the resources occupied by on-going eMBB data 502 the URLLC data 506 may be transmitted at the same time as the resources occupied by on-going eMBB data 502, e.g., the base station may transmit the URLLC data 506 on PDSCH 504 resources allocated for the eMBB data 502.

In an aspect, for a downlink transmission, a URLLC may puncture eMBB. When a URLLC punctures an eMBB, the base station may only transmit the URLLC data in the resources occupied by the URLLC. The eMBB data may be rate matched taking into account the missing resources. In other words, an eMBB UE may work around the resource elements that may be used for the URLLC data. In such an example, a base station may be the transmitter, and the UE the may be the receiver.

In an aspect, for an uplink transmission, an eMBB UE and a URLLC UE may transmit simultaneously transmit using the same resources. Because the URLLC has very high performance requirement, the URLLC data is likely to be transmitted with much higher power than the eMBB data in the occupied resource. Accordingly, the URLLC data may puncture the eMBB data. In an aspect, when the eMBB UE and the URLLC UE are the same UE, the eMBB data transmission may be skipped in the resources occupied by URLLC data. For an eMBB UE receiving a downlink transmission, the resources used for a URLLC may be zeroed out and/or ignored. For an eMBB UE receiving a URLLC uplink transmission, the resources used for a URLLC may not be used by the eMBB UE. Rather, the eMBB UE may rate match to use other available resources that have been scheduled for the eMBB UE.

RAN1 may use a URLLC indication (e.g., URLLC indicator) to indicate when the URLLC data 506 preempts and/or punctures the eMBB data 502. An indication of URLLC preemption or puncturing to an eMBB UE (104, 350, 404) regarding an impacted eMBB resource may facilitate eMBB UE (104, 350, 404) demodulation and decoding of a current transmission and/or subsequent retransmissions.

FIGS. 6-11 illustrate examples of designs for an indication channel. The examples illustrate various locations within frame structures of indication channel. In some examples, an indication channel may be separate from eMBB data and frequency division multiplexed (FDM) or time division multiplexed (TDM). (See FIGS. 6-8, 10, and 11.) In some examples, an indication channel may be embedded in eMBB data. (See FIGS. 9 and 11.) In other examples, an indication channel may be signaled in the grant or Radio Resource Control (RRC) configured per UE or per network configuration. (See FIGS. 6-8, 10, and 11.)

Figure 6:
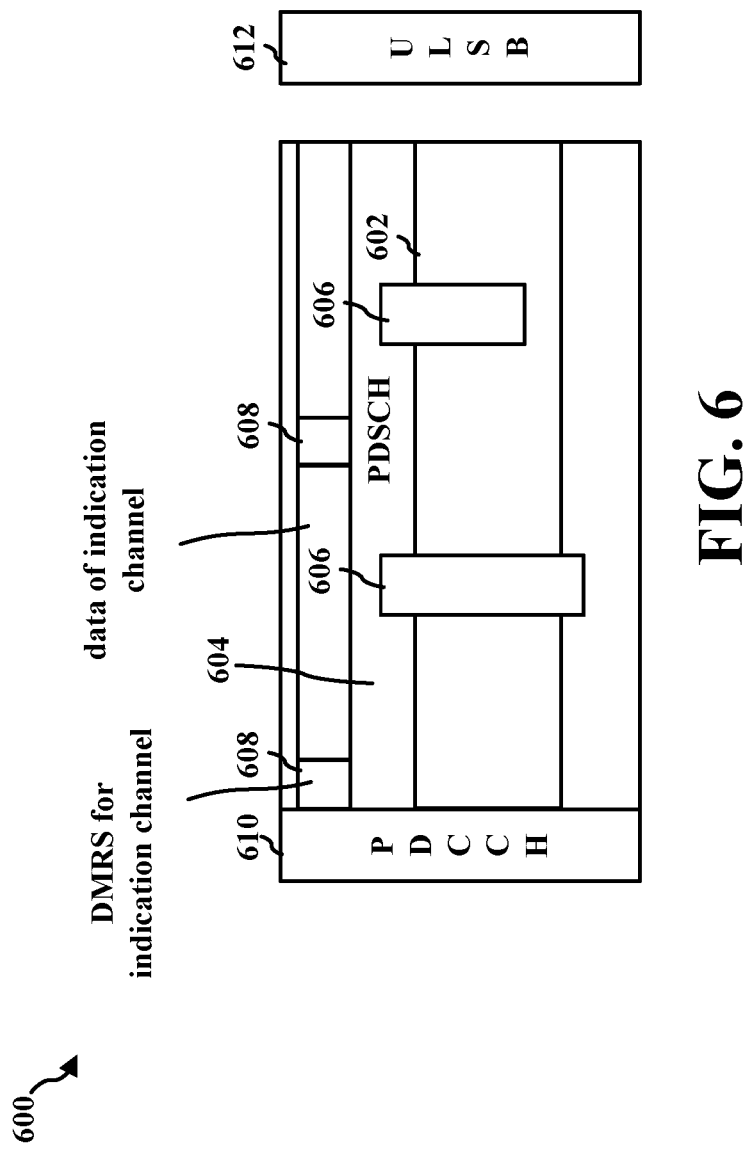
FIG. 6 is a diagram illustrating an example of a DL frame structure.

FIG. 6 is a diagram illustrating an example of a DL frame structure. The DL frame structure 600 includes eMBB data 602, a PDSCH 604, URLLC data 606, URLLC indicators 608, a PDCCH 610, uplink short burst (ULSB) 612.

FIG. 6 illustrates an example of a separate indication channel design. In some examples of indication channel signaling, an indication may be signaled per mini-slot or per a plurality of mini-slots. For example, one or more of the URLLC indicators 608 may be used.

In an aspect, the indication may be wideband based, i.e., the indication may indicate that the preemption or puncture will be of, for example, an entire available band. For example, referring to FIG. 2B, the one or more URLLC indicators 608 may indicate whether URLLC data preempts/punctures the entire DL system bandwidth. In an aspect, the indication may be sub-band based, i.e., the indication may indicate that the preemption or puncture will use less than the entire available band, e.g., a sub-band. For example, referring to FIG. 2B, the one or more URLLC indicators 608 may indicate whether URLLC data preempts/punctures a particular subset of subcarriers of the entire DL system bandwidth. In some aspects, the indication may be RB based or UE specific. Wide band or sub-band based indications may apply to all UEs using a wideband or that sub-band, e.g., for preempting or puncturing with URLLC.

A positive indication of a URLLC data 606 transmission, e.g., during a scheduled eMBB data 602 transmission, may impact all RBs in a set of RBs in the PDSCH data even though not all RBs in the set of RBs are used by URLLC data 606 transmission. Accordingly, the impact on all the RBs may be a waste of resources and a performance degradation. In some examples, the data in the set of RBs may be incomplete due to the PDSCH data. In another example, it may be possible to re-generate the data from the eMBB data 602, e.g., punctured by the PDSCH data, for example, due to data redundancy.

In an example, the indication may be RB based. Thus, the indication may be made on a per RB basis or a per RB group basis, e.g., every 4 RBs. For example, referring to FIGS. 2A, 2B, the one or more URLLC indicators 208 may providing an indication for x RBs, where x≥1.

In a UE specific example, an indication may be sent on a per UE basis. Accordingly, such indication may be sent directly to a particular UE, and may apply just for that UE. In an aspect, an indication may have different indication periodicity. Accordingly, the indication periodicity may be settable. For example, URLLC indicator periodicity may be configured semi-statically or dynamically. For a UE specific indication, the indicator may be per mini-slot or per mini-slot group. Some examples may use a single bit indication per UE or multiple bits per UE for the indication. In the single bit indication case, the bit may be set when at least one RB of the eMBB UE is occupied. An indication with multiple bits may provide better frequency resolution to indicate which RB or RB groups of an eMBB UE are occupied.

An example URLLC indicator may use a UL long burst structure at a slot level in terms of DMRS design, or other design features. For example, a PUCCH channel structure may be used for transmitting the URLLC indicator.

Shared DMRS may be used for all indications across all the mini-slots. Indication bits may be separately encoded or jointly encoded. Joint encoding may have better performance but may delay decoding. Additionally, joint encoding may need to buffer PDSCH. Separate encoding may support instantaneous decoding of indication bits, but bits may be split into groups of indication bits. A URLLC indicator may be transmitted using TDM/FDM or CDM.

Figure 7:
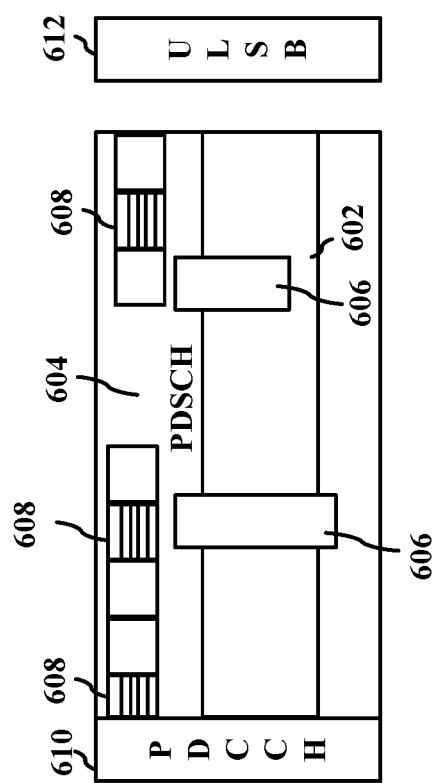
FIG. 7 is a diagram illustrating an example of a DL frame structure.

FIG. 7 is a diagram illustrating an example of a DL frame structure. The DL frame structure having a separate indication channel design 700 includes eMBB data 602, a PDSCH 604, URLLC data 606, a URLLC indicator 608, a PDCCH 610, uplink short burst (ULSB) 612. The example illustrates a separate indication channel design 700. The separate indication channel design 700 may use an UL short burst structure at mini-slot level. The separate indication channel design 700 may have short burst with or without DMRS (e.g., to achieve DMRS sharing between different mini-slots). Additionally, the separate indication channel design 700 may support instantaneous decoding of indication bits. As illustrated in FIG. 7, the URLLC indicator 608 may be part of the PDSCH 604.

Figure 8:
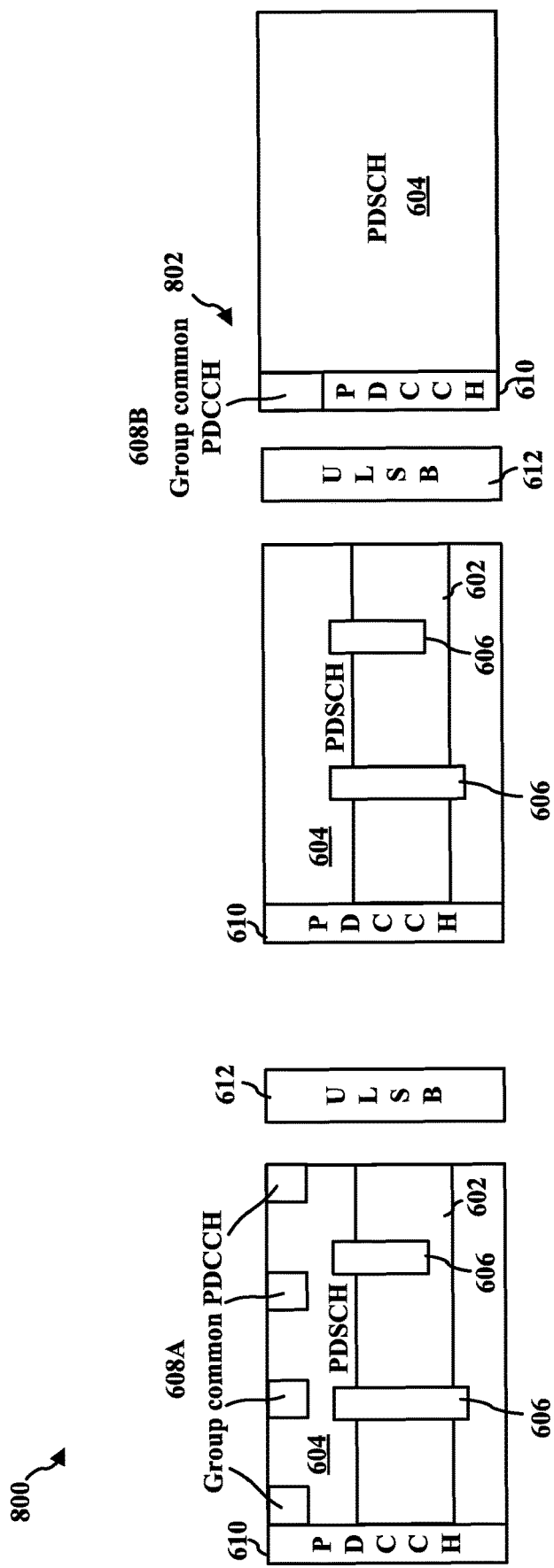
FIG. 8 is a diagram illustrating an example of a DL frame structure.

FIG. 8 is a diagram illustrating an example of a DL frame structure. The DL frame structure 800 includes eMBB data 602, a PDSCH 604, URLLC data 606, a URLLC indicator 608 (608A, 608B), a PDCCH 610, uplink short burst (ULSB) 612. The URLLC indicator 608A is a group common PDCCH in the PDSCH 604. The URLLC indicator 608A is a group common PDCCH in the PDCCH 610. The example may use a group common PDCCH 610 structure (PCFICH-type channel), i.e., DCI. The indicator may be conveyed in a group-common DCI message. For example, a group common PDCCH 610 may be used by a common group of devices. In one example, a BS may send to a set of UEs DCI message including one or more URLLC indicators every mini-slot. In another example, a common PDCCH 610 may be used by a common group of devices every mini-slot. In one example, a BS may send to a set of UEs DCI message including one or more URLLC indicators every few mini-slots. How often DCI messages are sent is configurable. In an example, the RS may be shared with DCI per slot. In another example, the URLLC indicator may use DCI message once per slot. When the URLLC indicator uses DCI message once per slot, that indicator may be transmitted in the beginning of the next slot after URLLC data is transmitted.

Figure 9:
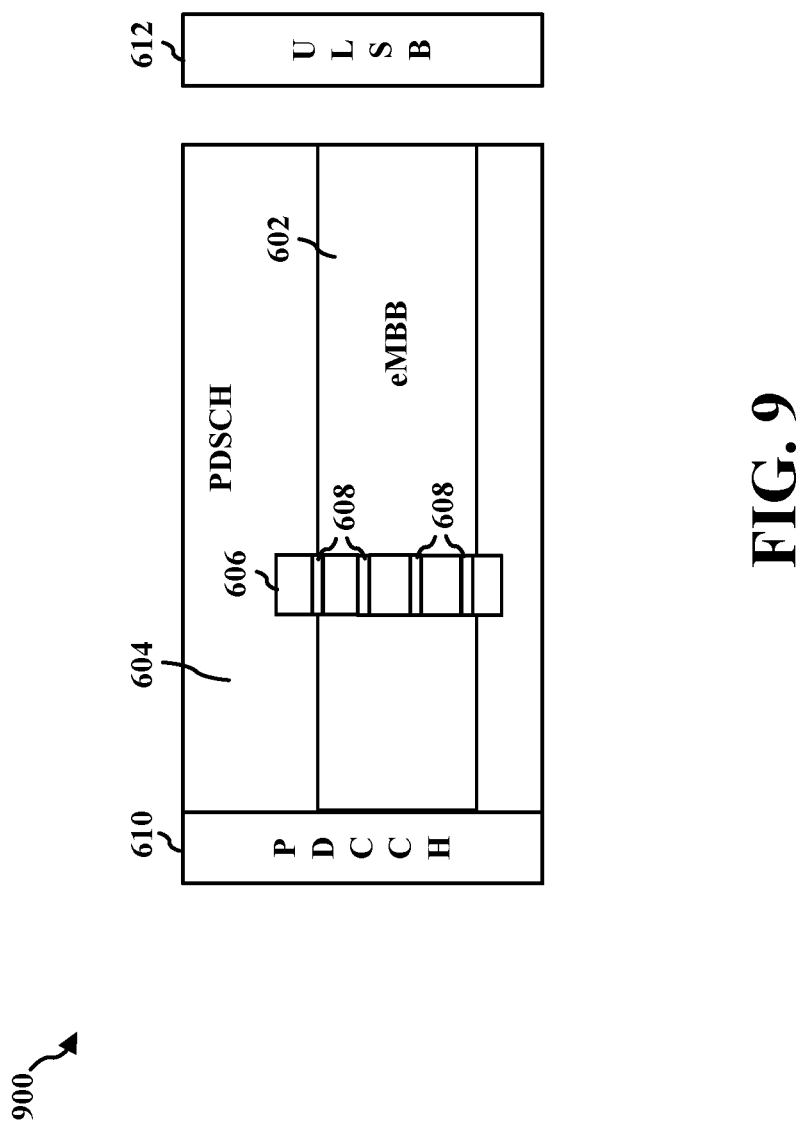
FIG. 9 is a diagram illustrating an example of a DL frame structure.

FIG. 9 is a diagram illustrating an example of a DL frame structure. The DL frame structure 600 includes eMBB data 602, a PDSCH 604, URLLC data 606, a URLLC indicator 608, a PDCCH 610, uplink short burst (ULSB) 612.

An example may use an embedded indication channel (URLLC indicator 608) design. The embedded indication channel design may be embedded in the eMBB data 602 region. Additionally, the indication channel may have a comb based structure, as illustrated in FIG. 9.

In an example, every four tones may be used for an indication channel. Additionally, in an example, when a URLLC data 606 transmission is not present, the URLLC indicator 608 might not be sent, e.g., to save overhead. Additionally, in an example, when a URLLC data 606 transmission is present, the comb based indication channel may also be turned into DMRS for the corresponding URLLC UE 104, 350, 404. In an aspect, the URLLC data 606 may rate match around the indication channel (DMRS).

For an indication monitoring duration (one or more mini-slot(s)), the eMBB UE may perform a blind detection of locations for URLLC DMRS to see if the URLLC data 606 is present. The blind detection may be similar to an ACK on the PUSCH in LTE but in a comb based transmission. RB bundling (e.g., sub-band bundling) of an indication channel may be used to increase processing gain and to ensure blindly decoding reliability. Additionally, spatial separation, scrambling, precoding, or other wireless communication processes may be used to reduce a false alarm rate in blind decoding.

An aspect may include a cell-specific collection of RBs that may be used by a UE that transmits a URLLC. The UE that transmits a URLLC may be signaled by a broadcast messages (or in a grant). The UE that transmits a URLLC may then use predefined mini-slots within the RBs to transmit a URLLC indicator. The URLLC indicator may points to the mini-slots which are being utilized. Additionally, the mini-slots being utilized may be jointly or separately encoded depending on requirements for granularity of the information in the mini-slots versus overhead for processing the mini-slots.

The following aspects may also hold for the indicator design regardless whether the indicator is transmitted in separate resource from the eMBB data or embedded in the URLLC.

In an aspect, an indication design may include an indication that may be at the beginning or end of a mini-slot. In another example, the indication may be at the beginning or end of a slot. In yet another example, the indication may be at the beginning or end of a set of multiple-mini-slots.

In an aspect, an indication design may be per mini-slot(s). A per mini-slot design may enable pipeline demodulation and/or decode processing.

In an aspect, an indication design may include the indication may be signaled dynamically or semistatically, whether indication is separate or embedded, whether indication is sub-band or per UE can be signaled, and/or granularity of indication.

In an aspect, an indication may be broadcast and may be sub-band based, such as an indication of preemption applying to a corresponding sub-band.

In an aspect, an indication may be unicast to a UE 104, 350, 404. The indication may be per UE per mini-slot (per preemption unit). Additionally, multiplexing across UEs may be TDM/FDM or CDM. Additionally, encoding of the indicator channel may be independently or group encoded.

Figure 10:
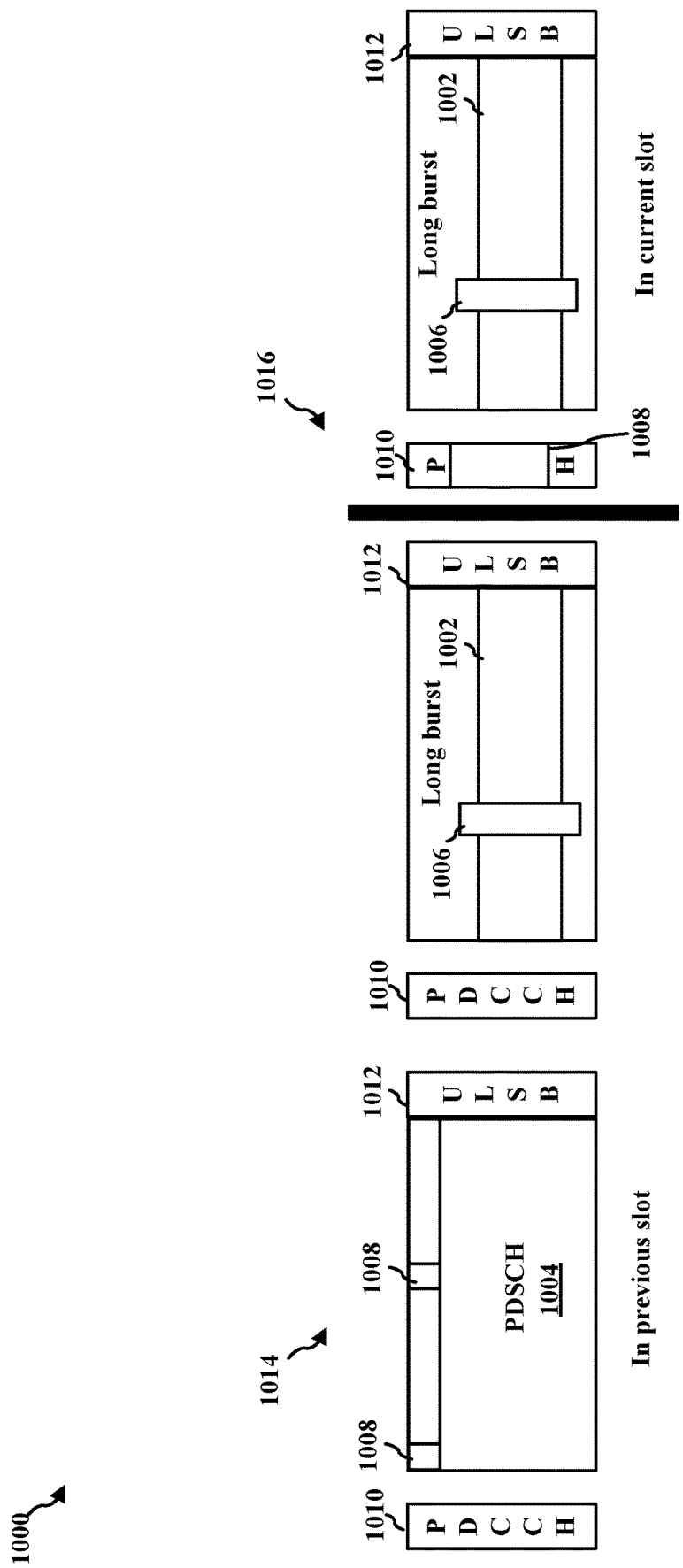
FIG. 10 is a diagram illustrating an example of a UL frame structure.

FIG. 10 is a diagram illustrating an example of a UL frame structure. The DL frame structure 1000 includes eMBB data 1002, a PDSCH 1004, URLLC data 1006, a URLLC indicator 1008, a PDCCH 1010, uplink short burst (ULSB) 1012. The ideas discussed with respect to FIGS. 6-9 for DL transmissions from a base station 102, 310, 402 to a UE 104, 350, 404 may be applied to UL transmissions from a UE 104, 350, 404 to a base station 102, 310, 402.

For scheduled URLLC data 1006, the base station 102, 310, 402 may need to send a URLLC indicator 608 to the eMBB UE beforehand so that the eMBB PDSCH 1004 may rate match around URLLC data 1006.

Some examples may use the same indication structure described with respect to previous FIGS. 6-9 to indicate a URLLC data 1006 transmission in an UL slot. For example, as discussed above, FIG. 6 is a diagram illustrating an example of a DL frame structure. The DL frame structure 600 of FIG. 6 includes eMBB data 602, a PDSCH 604, URLLC data 606, URLLC indicators 608, a PDCCH 610, uplink short burst (ULSB) 612. FIG. 6 illustrates an example of a separate indication channel design. In some examples of indication channel signaling, an indication may be signaled per mini-slot or per a plurality of mini-slots. For example, one or more of the URLLC indicators 608 may be used. FIG. 7 is a diagram illustrating an example of a DL frame structure. The DL frame structure of the indication channel design 700 includes eMBB data 602, a PDSCH 604, URLLC data 606, a URLLC indicator 608, a PDCCH 610, ULSB 612. The example illustrates a separate indication channel design 700. FIG. 8 is a diagram illustrating an example of a DL frame structure. The DL frame structure 800 includes eMBB data 602, a PDSCH 604, URLLC data 606, a URLLC indicator 608, a PDCCH 610, ULSB 612. FIG. 9 is a diagram illustrating an example of a DL frame structure. The DL frame structure 600 includes eMBB data 602, a PDSCH 604, URLLC data 606, a URLLC indicator 608, a PDCCH 610, ULSB 612.

In some examples, the URLLC indicator 1008 may be transmitted in a previous slot with a separate channel. Some examples may reuse UL long and/or short burst channel structure in a main DL portion. Some examples may reuse DCI in either main DL portion or in PDCCH region. Some examples may transmit in a current slot in PDCCH region. Some examples may reuse DCI. The indication channel for DL and UL URLLC data 1006 transmission may be TDM/FDM/CDM.

As illustrated in FIG. 10, the URLLC indicator 1008 may be transmitted embedded 1114, in a previous slot 1014 or in a current slot 1016.

Figure 11:
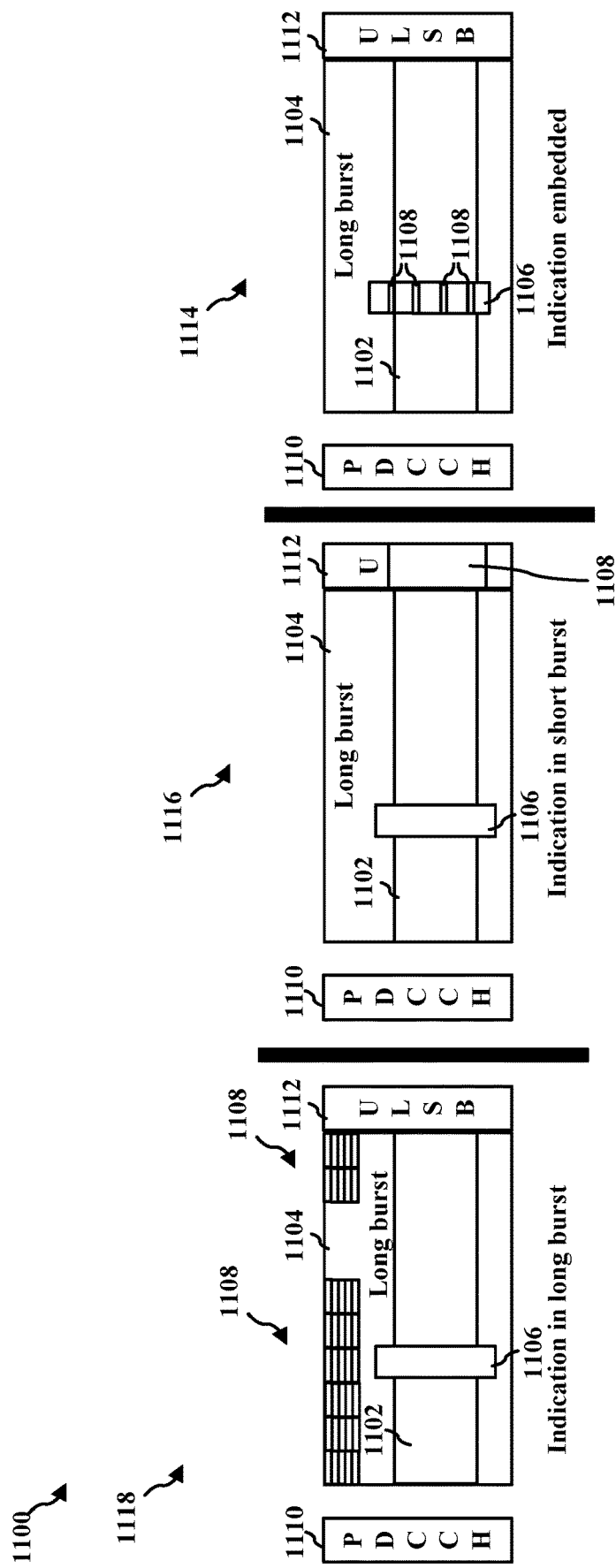
FIG. 11 is a diagram illustrating an example of a UL frame structure.

FIG. 11 is a diagram illustrating an example of a UL frame structure. The DL frame structure 1100 includes eMBB data 1102, a PUSCH 1104, URLLC data 11011, a URLLC indicator 1108, a PDCCH 1110, uplink short burst (ULSB) 1112.

FIG. 11 illustrates examples of URLLC indications 1108 for transmission without scheduling. The URLLC scheduling request (SR) or URLLC data 1106 may puncture eMBB PUSCH 1104. In the example of FIG. 11, the URLLC UE 104, 350, 404 may need to transmit an indication to the base station 102, 310, 402 (e.g., eNB, gNB). The eMBB UE 104, 350, 404 may not be aware of the presence of URLLC transmission. Accordingly, an indication may be transmitted in separate channel in a long burst, or in a short burst. In an example, an indication may be a short transmission. Additionally, in some examples, the URLLC indicator 1108 from different URLLC UEs 104, 350, 404 may be TDM/FDM/CDM.

In some examples, the URLLC indicator 1108 may be embedded in long burst with a comb based structure. As illustrated in FIG. 11, the URLLC indicator 1108 may be transmitted embedded 1114, in a ULSB 1112 in a short burst, and/or in the PUSCH 1104 in a long burst.

As described herein, in an aspect, a URLCC device may send an indicator of URLLC data. The indicator of the URLLC data may, in some examples, be sent regardless of whether URLLC data is present or not. For example, the URLLC indicator may indicate that URLLC data is present and where the URLLC data is located in a transmission. The URLLC indicator may also indicate that no URLLC data is present in a particular transmission. Thus, a URLLC device may transmit a URLLC indicator to another device, such as an eMBB UE. The other device may be required to monitor for the URLLC indicator to determine if URLCC data is present and to then take appropriate action when the URLLC data is present. For example, an eMBB UE may rate match around the URLLC data or zero out any received URLLC data base on the existence of URLLC data as may be indicated by the URLCC indicator. In a case when the URLCC indicator indicates that no URLLC data, the other device may do nothing. For example, the eMBB UE will not be required to rate match any transmitted data around URLCC data or zero out any received data. In other examples, URLLC indicators might be sent only when URLLC data is present.

Figure 12:
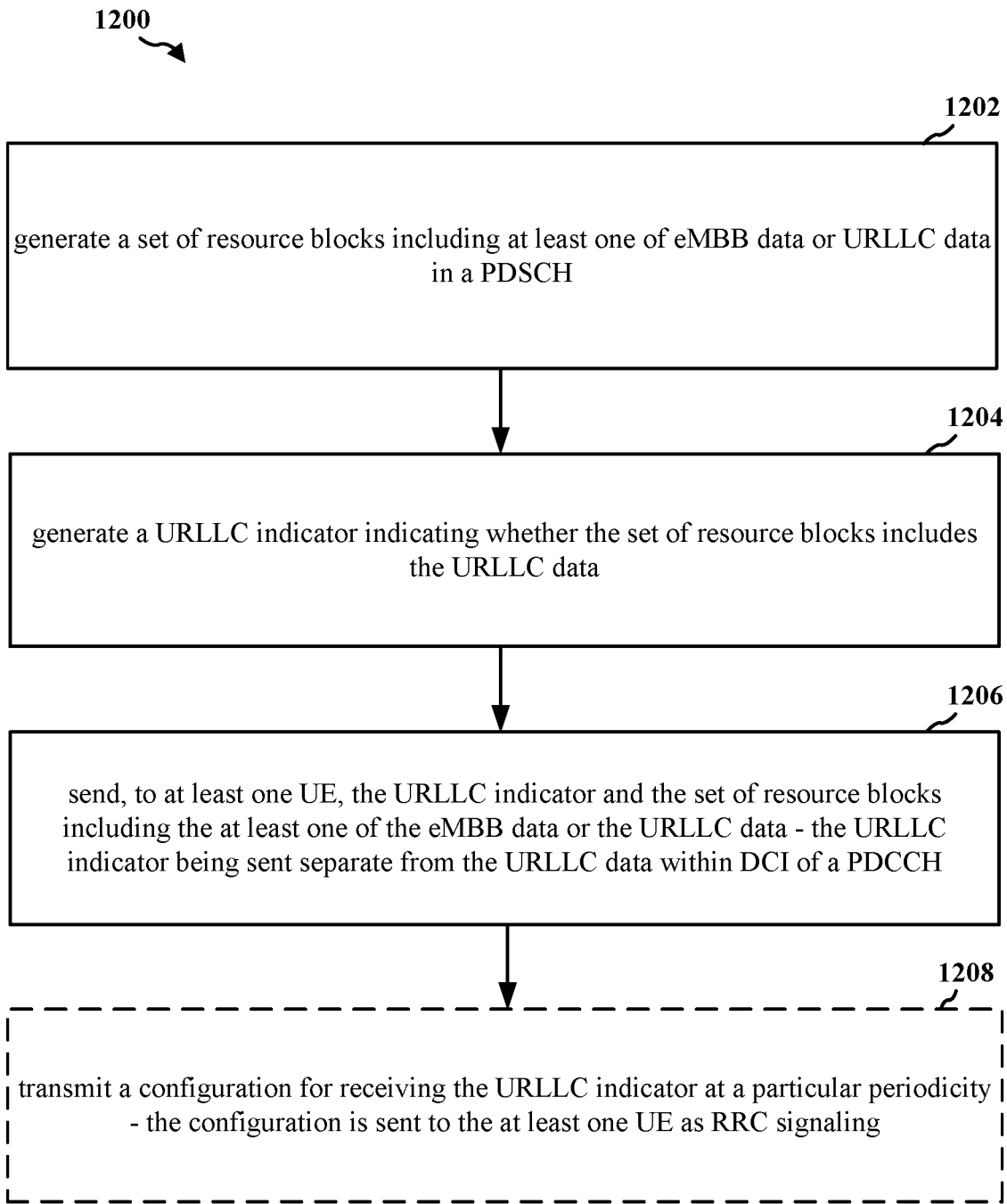
FIG. 12 is a flowchart of a method of wireless communication.

FIG. 12 is a flowchart 1200 of a method of wireless communication. The method may be performed by a base station (e.g., the base station 102, 310, 402, the apparatus 1802, 1802'). At 1202, the base station generates a set of resource blocks including at least one of eMBB data or URLLC data in a PDSCH. The URLLC data may be one of embedded in the eMBB data or unembedded in the eMBB data. For example, referring to FIGS. 6-9, the base station (e.g., base station 102, 310, 402, the apparatus 2202, 2202') may generate a set of resource blocks such as the resource blocks illustrated in FIGS. 2A, 2C. The resource blocks may include at least one of eMBB data 602 or URLLC data 606 in a PDSCH 604. An example PDSCH 604 structure is illustrated in FIG. 2B. As illustrated in FIGS. 6-9, the URLLC data 606 may be embedded in the eMBB data 602. The URLLC data 606 may be unembedded, or separated from, the eMBB data 602. For example, there may be no URLLC data 606. Generating a set of resource blocks including at least one of eMBB data 602 or URLLC data in a PDSCH may include obtaining MBB data, the URLLC data, or both MBB data and the URLLC data, and mapping the data to the set of resource blocks. Generating a set of resource blocks including at least one of eMBB data 602 or URLLC data in a PDSCH may include embedding the URLLC data in the eMBB data 602 or not embedding the URLLC data in the eMBB data 602.

At 1204, the base station generates a URLLC indicator indicating whether the set of resource blocks includes at least part of the URLLC data. For example, as illustrated in FIGS. 6-9, the base station (e.g., base station 102, 310, 402, the apparatus 2202, 2202') generates a URLLC indicator 608 indicating whether the set of resource blocks includes the URLLC data 606. In an aspect, the URLLC indicator 608 may be a downlink indicator in DCI. For example, FIG. 8, illustrates a group common PDCCH indicator 608B, i.e., a downlink indicator in DCI. Generating a URLLC indicator 608 indicating whether the set of resource blocks includes the URLLC data 606 may include determining when the set of resource blocks is to includes the URLLC data 606 and creating an indicator 608 based on that determination.

In an aspect, an indication may include a post indication. For example, the indication in FIG. 8 may be a post indication, i.e., an indication at the start of the next one or more slots. For example, post indication may appear at the start of the next slot. See, for example, FIG. 8, in which the group common PDCCH indicator 608B is in a slot after corresponding URLLC preempt or puncturing resources occupied by an ongoing eMBB communication has occurred. The indication may indicate whether the URLLC data 606 is present or not. In an aspect, an indication may be configured to be a wideband indication, e.g., the data space preempted (which may or may not be completely used for data) uses all or a large portion of a band or bands in a slot. For example, preemption may extend across all subcarriers of a carrier. FIG. 2B illustrates an example downlink system bandwidth where preemption may occur. In an aspect, an indication may be configured to be a sub-band indication, e.g., the data space preempted-which may or may not be completely used for data) uses a small or smaller portion of a band or bands in a slot as compared to wideband. For example, preemption may extend across one or more subsets of the subcarriers of the carrier. FIG. 2B illustrates an example downlink system bandwidth where preemption may occur. The sub-band indication may be used to indicate use of two sub-bands. The indication may be configured to indicate one or more symbols by configuring the monitoring periodicity.

The generation of a URLLC indicator 608 indicating that the URLLC data 606 is within the portion of the resource blocks with the eMBB data 602 may include determining that the URLLC data 606 is within the portion of the resource blocks with the eMBB data 602 and/or creating the URLLC indicator 608 based on the determination.

At 1206, the base station sends, to at least one UE, the URLLC indicator and the set of resource blocks including the at least one of the eMBB data or the URLLC data. The URLLC indicator may be sent separate from the URLLC data within DCI of a PDCCH. For example, referring to FIGS. 6-9, the base station (e.g., base station 102, 310, 402, the apparatus 2202, 2202') may send, to at least one UE (e.g., UE 104, 350, 404, the apparatus 2002, 2002') the URLLC indicator 608 and the set of resource blocks including the at least one of the eMBB data 602 or the URLLC data 606. Referring to FIGS. 6-8, the URLLC indicator 608 may be sent separate from the URLLC data 606 within DCI of a PDCCH 610. For example, see the group common PDCCH indicator 608B of FIG. 8. An example PDCCH is illustrated in FIG. 2B. In some aspects, an indicator 608 may be sent regardless of the presence of URLLC data 606. For example, a URLLC indicator 608 may be sent periodically. In other aspects, a URLLC indicator 608 may be sent only when URLLC data 606 is present. Sending the URLLC indicator 608 and the set of resource blocks including the eMBB data 602 and the URLLC data 606 to at least one UE (e.g., UE 104, 350, 404, the apparatus 2002, 2002') may include providing the URLLC indicator 608 and the set of resource blocks to a transmit device and/or causing the URLLC indicator 608 and the set of resource blocks to be transmitted. Sending, to at least one UE (e.g., UE 104, 350, 404, the apparatus 2002, 2002') the URLLC indicator 608 and the set of resource blocks including the at least one of the eMBB data 602 or the URLLC data 606 may include transferring information to a transmitter and causing the transmitter to transmit the information. The information may include the URLLC indicator 608 and the set of resource blocks including the at least one of the eMBB data 602 or the URLLC data 606. The information may also indicate how to send the URLLC indicator 608 and the set of resource blocks, e.g., the URLLC indicator 608 may be sent embedded within the URLLC data 606 or may be sent separate from the URLLC data 606 within DCI of a PDCCH (indicator 608B). The URLLC indicator 608 may be within a separate indicator channel.

At 1208, the base station configures a periodicity for sending the URLLC indicator. For example, the base station (e.g., base station 102, 310, 402, the apparatus 2202, 2202') may configure a periodicity for sending the URLLC indicator 608. Thus, the timing for sending of the URLLC indicator may be settable. The timing for the periodicity may be determined by the base station (e.g., base station 102, 310, 402, the apparatus 2202, 2202') and the base station (e.g., base station 102, 310, 402, the apparatus 2202, 2202') may transmit that timing to a UE (e.g., UE 104, 350, 404, the apparatus 2002, 2002'), e.g., as RRC signaling. The base station (e.g., base station 102, 310, 402, the apparatus 2202, 2202') may dynamically configure a periodicity for sending the URLLC indicator 608. Accordingly, the indicator may be sent with a changeable periodicity. In another aspect, the base station (e.g., base station 102, 310, 402, the apparatus 2202, 2202') may semi-statically configure a periodicity for sending the URLLC indicator. Accordingly, the indicator may be sent with a periodicity that does not change or does not change often, e.g., such as when communications between particular UE and a particular base station begins. Configuring a periodicity for sending the URLLC indicator 608 may include of selecting a time period and/or applying the time period to the sending of step 1206.

In an aspect, the URLLC indicator may be sent separately from the URLLC data. The URLLC indicator may be within the DCI of a group-common PDCCH. For example, the URLLC indicator 608 may be sent separately from the URLLC data 606. (See FIGS. 7-8.) The URLLC indicator 608 may be within the DCI of a group-common PDCCH 610. (See 608B, FIG. 8.)

In an aspect, the set of resource blocks from the base station includes the eMBB data. The indicator indicates whether the URLLC data is embedded within the eMBB data. For example, referring to FIGS. 6-9, in an aspect, the set of resource blocks (e.g., see RB, FIGS. 2A, 2C) from the base station (e.g., base station 102, 310, 402, the apparatus 2202, 2202') includes the eMBB data 602. Additionally, the indicator 608 indicates whether the URLLC data 606 is embedded within the eMBB data 602.

In an aspect, the set of resource blocks from the base station includes the URLLC data in the PDSCH. Additionally, the URLLC indicator indicates that the URLLC data is present in the set of resource blocks. For example, referring to FIGS. 6-9, the set of resource blocks from the base station (e.g., base station 102, 310, 402, the apparatus 2202, 2202') includes the URLLC data 606 in the PDSCH 604. Additionally, the URLLC indicator 608 indicates that the URLLC data 606 is present in the set of resource blocks. (Examples of reference blocks may be found in FIGS. 2A, 2C.

In an aspect, the URLLC indicator is sent embedded within the URLLC data. For example, referring to FIGS. 6-9, in an aspect, the URLLC indicator 608 may be sent embedded within the URLLC data 606.

In an aspect, the set of resource blocks is sent in a slot before a slot in which the URLLC indicator is sent. The URLLC indicator may be a post indication indicating whether the set of resource blocks includes at least part of the URLLC data. For example, the set of resource blocks is sent in the slot before the slot in which the URLLC indicator 608 is sent. The URLLC indicator 608 may be a post indication indicating whether the set of resource blocks includes the URLLC data 606. For example, the URLLC data 606 before is illustrated as being before URLLC indicator 608B in FIG. 8.

FIG. 2B illustrates examples of downlink system bandwidth. In an aspect, the URLLC indicator is wideband based and indicates that the URLLC data extends across all subcarriers of a carrier. In an aspect, the URLLC indicator is subband based and indicates that the URLLC data extends across one or more subsets of the subcarriers of the carrier. For example, the URLLC indicator 608 may be wideband based and may indicate that the URLLC data 606 extends across all subcarriers of a carrier. In an aspect, the URLLC indicator 608 is subband based and indicates that the URLLC data 606 extends across one or more subsets of the subcarriers of the carrier.

In an aspect, the set of resource blocks may be transmitted in a slot before a slot in which the URLLC indicator is received. The URLLC indicator may include a post indication. The post indicating may indicate whether the set of resource blocks received in the slot before the slot in which the URLLC indicator is transmitted includes the URLLC data.

An aspect may transmit a configuration for transmitting the URLLC indicator. The configuration may specify a periodicity at which the URLLC indicator is transmitted.

Figure 13:
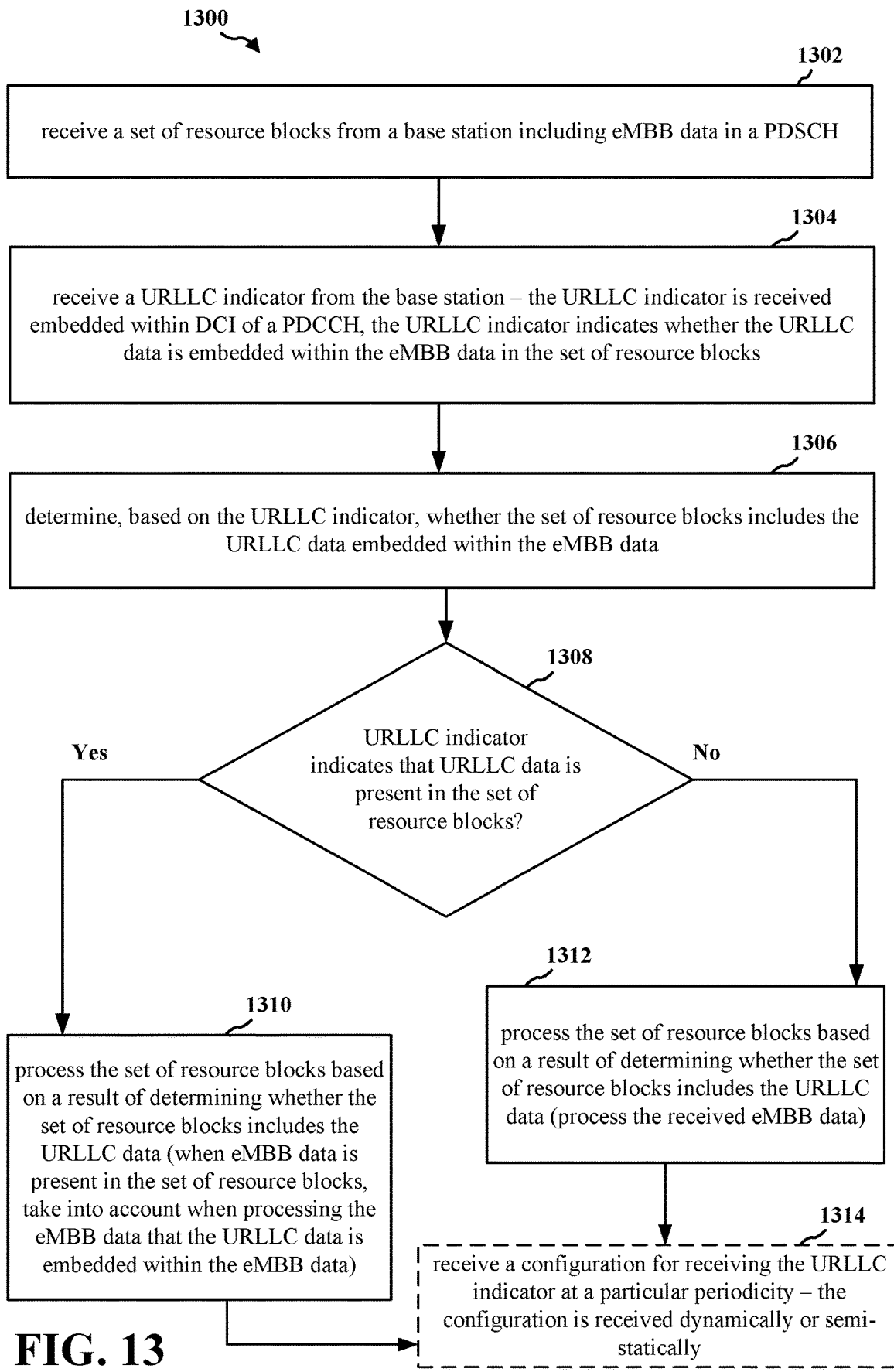
FIG. 13 is a flowchart of a method of wireless communication.

FIG. 13 is a flowchart 1300 of a method of wireless communication. The method may be performed by a UE (e.g., the UE 104, 350, 404, the apparatus 2002, 2002'). At 1302, the UE receives a set of resource blocks from a base station including eMBB data. For example, referring to FIGS. 6-9, the UE (e.g., UE 104, 350, 404, the apparatus 2002, 2002') may receive a set of resource blocks from a base station (e.g., base station 102, 310, 402, the apparatus 2202, 2202') including eMBB data 602. The receiving the set of resource blocks including a PDSCH from the base station may include tuning to a base station, receiving data from the base station, determining the resource blocks from the base station, and/or determining the PDSCH from the received resource block.

At 1304, the UE receives a URLLC indicator from the base station. The URLLC indicator is received within DCI of a PDCCH. The URLLC indicator indicates whether the set of resource blocks includes the URLLC data. The URLLC data may be embedded in eMBB data. For example, the UE (e.g., UE 104, 350, 404, the apparatus 2002, 2002') may receive a URLLC indicator 608 from the base station (e.g., base station 102, 310, 402, the apparatus 2202, 2202'). For example, referring to FIG. 9, the URLLC indicator 608 may also be received embedded within the URLLC data 606. For specifically, referring to FIG. 8, the URLLC indicator 608 may be within DCI of a PDCCH 610. For example, see the group common PDCCH indicator 608B of FIG. 8. An example format for the PDCCH may be found in FIG. 2B. The URLLC indicator 608 may be received URLLC indicator 608 may be sent as part of the bits that make up the DCI. The URLLC indicator 608 indicates whether the set of resource blocks include the URLLC data 606. Referring to FIGS. 6-9, in an example, the URLLC data 606 may be embedded in eMBB data 602. The URLLC data 606 does not always preempt or puncture resources occupied eMBB communication. In some aspects, an indicator may be received regardless of the presence of URLLC data 606. For example, a URLLC indicator may be received periodically. In other aspects, a URLLC indicator may be received only when URLLC data 606 is present. Receiving a URLLC indicator 608 from the base station may include tuning to a base station, receiving data from the base station, and/or determining the indicator from the base station.

At 1306, the UE determines, based on the URLLC indicator, whether the set of resource blocks includes the URLLC data embedded within the eMBB data. For example, referring to FIGS. 6-9, the UE (e.g., UE 104, 350, 404, the apparatus 2002, 2002') determines, based on the URLLC indicator 608, whether the set of resource blocks includes the URLLC data 606 embedded within the eMBB data 602. Determining, based on the URLLC indicator, whether the set of resource blocks includes the URLLC data 606 may include processing received signals including the URLLC indicator to determine the URLLC indicator and processing the URLLC indicator to determine whether the set of resource blocks includes the URLLC data 606.

At 1308, a decision is made based on the determination at 1306. When the URLLC indicator determines that the set of resource blocks includes the URLLC data block 1310 may be executed. When the URLLC indicator determines that the set of resource blocks does not include the URLLC data block 1312 may be executed.

At 1310, the UE processes the set of resource blocks based on a result of determining whether the set of resource blocks includes the URLLC data (e.g., when eMBB data is present in the set of resource blocks, take into account when processing the eMBB data that the URLLC data is embedded within the eMBB data). For example, the UE (e.g., UE 104, 350, 404, the apparatus 2002, 2002') may process the set of resource blocks based on a result of determining whether the set of resource blocks includes the URLLC data 606 using one or more of the processors 356, 368, 359 illustrated in FIG. 3. The received set of resource blocks including the at least one of the eMBB data 602 or the URLLC data 606. Processing the received set of resource blocks including the at least one of the eMBB data 602 or the URLLC data 606 may include reading a memory location storing the URLLC indicator to determine the indicator's state (or otherwise determining the indicator's state) and processing the resource blocks base on the indicator's state. In an aspect, processing may include either rate matching around the embedded URLLC data or discarding the URLLC data based on the URLLC indicator. In an aspect, the UE may send an ACK/NACK as part of 1310.

At 1312, the UE processes the set of resource blocks based on a result of determining whether the set of resource blocks includes the URLLC data (e.g., when no URLLC data is present). For example, the UE (e.g., UE 104, 350, 404, the apparatus 2002, 2002') may process (e.g., in a processor 356, 368, 359), process the set of resource blocks based on a result of determining whether the set of resource blocks includes the URLLC data 606. Processing the received set of resource blocks including the at least one of the eMBB data 602 or the URLLC data 606 may include reading a memory location storing the URLLC indicator to determine the indicator's state (or otherwise determining the indicator's state) and processing the resource blocks base on the indicator's state. In an aspect, the UE may send an ACK/NACK as part of 1312.

At 1314, a UE receives a configuration for receiving the URLLC indicator at a particular periodicity. The configuration may be received dynamically or semi-statically. For example, a UE (e.g., UE 104, 350, 404, the apparatus 2002, 2002') may receive a configuration for sending the URLLC indicator at a particular periodicity. In an aspect, the UE (e.g., UE 104, 350, 404, the apparatus 2002, 2002') may dynamically receive a configuration for sending the URLLC indicator 608 at a particular periodicity. Accordingly, the indicator may be sent with a changeable periodicity. In an aspect, the UE (e.g., UE 104, 350, 404, the apparatus 2002, 2002') may semi-statically receive a configuration for sending the URLLC indicator 608 at a particular periodicity. Accordingly, the indicator may be sent with a periodicity that does not change or does not change often, e.g., such as when communications between particular UE and a particular base station begins. In an aspect, the configuration may specified a periodicity at which the URLLC indicator is transmitted. In an aspect, after preemption has occurred, a UE (e.g., UE 104, 350, 404, the apparatus 2002, 2002') may send an acknowledge (ACK) when some preempted data has decoded properly at the UE, e.g., because of replacement, redundancy, or both; or a negative acknowledge (NACK) when some preempted data has decoded improperly. For example, the ACK or NACK may be sent back to the base station. An aspect may transmit one of an ACK or a NACK based on whether the set of resource blocks are properly decoded when processing the set of resource blocks. The block 1314 may occur to prepare for a subsequent execution of the flowchart (or as an initial step in the flow chart) in some examples, In an aspect, the URLLC indicator may be received separately from the URLLC data. The URLLC indicator may be within the DCI of a group-common PDCCH. For example, referring to FIGS. 7-8, the URLLC indicator 608 may be received separately from the URLLC data 606. The URLLC indicator 608 may be within the DCI of a group-common PDCCH 610. For example, FIG. 8, URLLC indicator 608B illustrates a URLLC indicator 608 within the DCI of a group-common PDCCH 610.

In an aspect, the set of resource blocks from the base station includes the eMBB data. The indicator indicates whether the URLLC data is embedded within the eMBB data. For example, referring to FIGS. 6-9, in an aspect, the set of resource blocks (from the base station (e.g., base station 102, 310, 402, the apparatus 2202, 2202') includes the eMBB data 602. The indicator 608 indicates whether the URLLC data 606 is embedded within the eMBB data 602.

In an aspect, the set of resource blocks from the base station includes the URLLC data in the PDSCH. Additionally, the URLLC indicator indicates that the URLLC data is present in the set of resource blocks. For example, referring to FIGS. 6-9, the set of resource blocks from the base station (e.g., base station 102, 310, 402, the apparatus 2202, 2202') includes the URLLC data 606 in the PDSCH 604. Additionally, the URLLC indicator 608 indicates that the URLLC data 606 is present in the set of resource blocks.

In an aspect, the URLLC indicator is received embedded within the URLLC data. For example, referring to FIGS. 6-9, in an aspect, the URLLC indicator 608 may be received embedded within the URLLC data 606.

In an aspect, the set of resource blocks is received in a slot before a slot in which the URLLC indicator is received. The URLLC indicator may be a post indication indicating whether the set of resource blocks includes the URLLC data. For example, the set of resource blocks is received in a slot before the slot in which the URLLC indicator 608 is received. The URLLC indicator 608 may be a post indication indicating whether the set of resource blocks includes the URLLC data 606. For example, see the URLLC data 606, which is before the URLLC indicator 608B in FIG. 8.

In an aspect, the URLLC indicator is wideband based and indicates that the URLLC data extends across all subcarriers of a carrier. In an aspect, the URLLC indicator is subband based and indicates that the URLLC data extends across one or more subsets of the subcarriers of the carrier. For example, the URLLC indicator 608 may be wideband based and may indicate that the URLLC data 606 extends across all subcarriers of a carrier. In an aspect, the URLLC indicator 608 is subband based and indicates that the URLLC data 606 extends across one or more subsets of the subcarriers of the carrier.

In an aspect, the set of resource blocks may be received in a slot before a slot in which the URLLC indicator is received. The URLLC indicator may include a post indication. The post indicating may indicate whether the set of resource blocks received in the slot before the slot in which the URLLC indicator is received includes the URLLC data.

An aspect may receive a configuration for receiving the URLLC indicator. The configuration may specify a periodicity at which the URLLC indicator is received.

Figure 14:
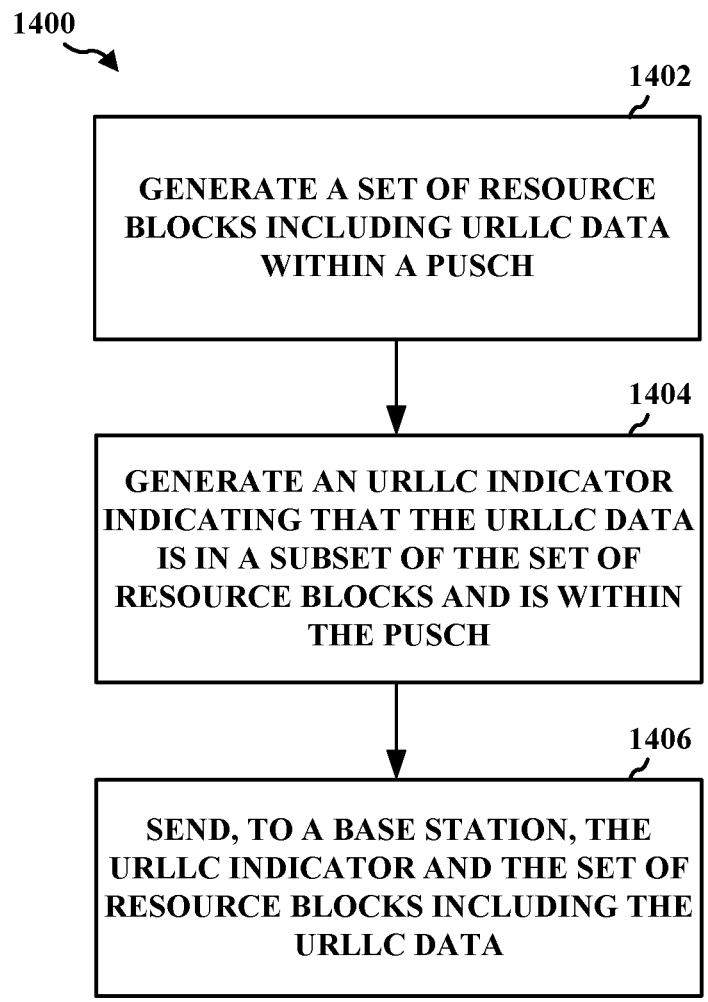
FIG. 14 is a flowchart of a method of wireless communication.

FIG. 14 is a flowchart 1400 of a method of wireless communication. The method may be performed by a UE (e.g., the UE 104, 350, 404, the apparatus 2002, 2002'). At 1402, a UE generates a set of resource blocks including URLLC data. For example, a UE 104, 350, 404 may generate a set of resource blocks including URLLC data 1106. (See FIG. 11.)

At 1404, a UE generates a URLLC indicator indicating that the URLLC data is in a subset of the set of resource blocks and is within the PUSCH. For example, the UE may generate a URLLC indicator 1108 indicating that the URLLC data 1106 is in a subset of the set of resource blocks and is within the PUSCH 1116. (See FIG. 11.)

At 1406, a UE sends, to a base station, the URLLC indicator and the set of resource blocks including the URLLC data. For example, the UE 104, 350, 404 sends, to a base station 102, 310, 402, the URLLC indicator 1108 and the set of resource blocks including the URLLC data 1106. (See FIG. 11.) In some aspects, an indicator may be sent regardless of the presence of URLLC data. For example, a URLLC indicator may be sent periodically. In other aspects, a URLLC indicator may be sent only when URLLC data is present.

At 1408, a UE receives a configuration for sending the URLLC indicator at a particular periodicity, wherein the configuration is received one of dynamically or semi-statically. For example, a UE 104, 350, 404 receives a configuration for sending the URLLC indicator 1108 at a particular periodicity, wherein the configuration is received one of dynamically or semi-statically.

In an aspect, the URLLC indicator 1108 may be frequency division multiplexed, time division multiplexed, and/or code division multiplexed into a subset of the set of resource blocks separate from the eMBB data 1102 (1116), or embedded in the URLLC data 1106 within the subset of the set of resource blocks (1114).

In an aspect, the URLLC indicator 1108 does not overlap with the eMBB data 1102 (1116).

In an aspect, the URLLC indicator 1108 may be sent in a URLLC indicator channel with DMRS (in resource blocks 1114). In an aspect, a wireless communication device may check to determine whether certain tones contain a DMRS pattern. Certain tones containing a DMRS pattern may indicate that the URLLC data is present. In an aspect, the URLLC data punctures eMBB data in the PDSCH.

In an aspect, the URLLC indicator 1108 may be embedded in the URLLC data 1106 (1114).

In an aspect, the URLLC indicator 1108 and the URLLC data 1106 may have a comb subcarrier structure (e.g., in resource blocks 1114).

In an aspect, the URLLC indicator 1108 may be sent in a URLLC indicator channel with DMRS (e.g., in resource blocks 1114). In an aspect, a wireless communication device may check to determine whether certain tones contain a DMRS pattern. Certain tones containing a DMRS pattern may indicate that the URLLC data is present. In an aspect, the URLLC data punctures eMBB data in the PDSCH.

In an aspect, the URLLC indicator includes a post indication.

In an aspect, the URLLC indicator further indicates that the URLLC data is preempting one of wideband data or sub-band data.

Figure 15:
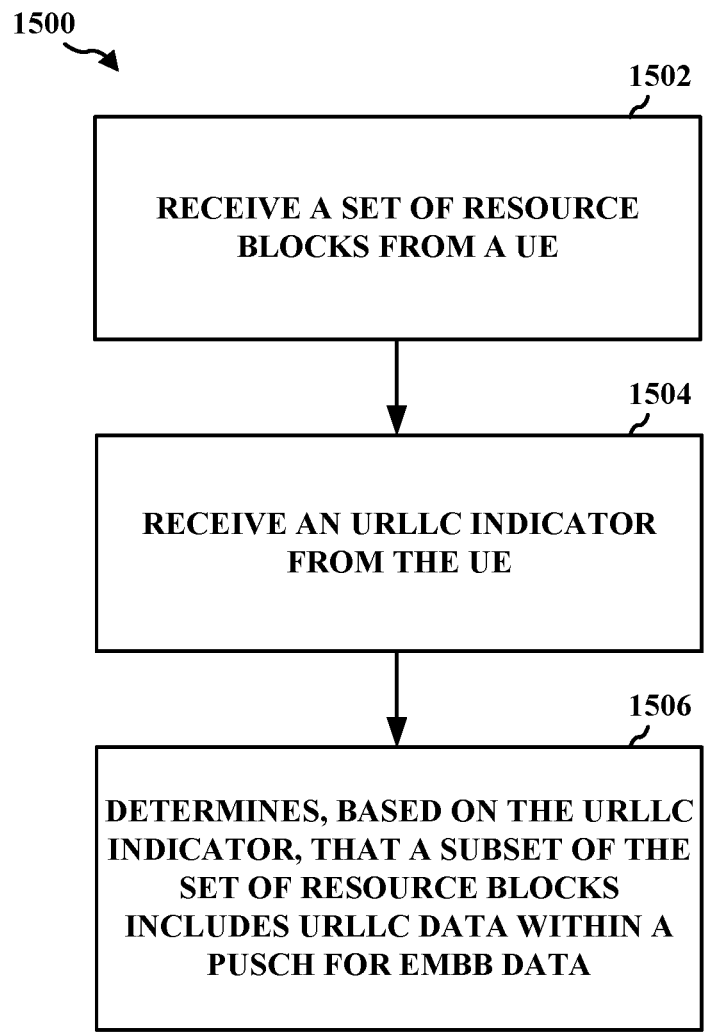
FIG. 15 is a flowchart of a method of wireless communication.

FIG. 15 is a flowchart 1500 of a method of wireless communication. The method may be performed by a base station (e.g., the base station 102, 310, 402, the apparatus 1802, 1802'). At 1502, the base station receives a set of resource blocks from a UE. For example, the base station 102, 310, 402 receives a set of resource blocks from a UE 104, 350, 404.

At 1504, the base station (e.g., 102, 310, 402, 1802, 1802') receives a URLLC indicator from the UE (e.g., UE 104, 350, 404, the apparatus 2002, 2002'). In some aspects, an indicator may be received regardless of the presence of URLLC data. For example, a URLLC indicator may be received periodically. In other aspects, a URLLC indicator may be received only when URLLC data is present.

At 1506, the base station determines, based on the URLLC indicator, that a subset of the set of resource blocks includes URLLC data. For example, the base station 102, 310, 402, 1802, 1802' may determine, based on the URLLC indicator 1108, that a subset of the set of resource blocks includes URLLC data 1106.

In an aspect, the URLLC indicator 1108 may be frequency division multiplexed, time division multiplexed, code division multiplexed into a subset of the set of resource blocks separate from the eMBB data 1102 (1116), and/or embedded in the URLLC data 1106 within the subset of the set of resource blocks (1114).

In an aspect, the URLLC indicator 1108 may identify a location of the URLLC data 1106.

In an aspect, the URLLC indicator 1108 may be frequency division multiplexed with a PDCCH 1110 in the subset of the set of resource blocks and/or frequency division multiplexed with a PUSCH 1104 in the subset of the set of resource blocks. (See FIG. 11.)

In an aspect, the URLLC indicator 1108 may be embedded in the URLLC data 1106. (See FIG. 11.)

In an aspect, the URLLC indicator 1108 and the URLLC data 1106 may have a comb subcarrier structure (e.g., in resource blocks 1114).

In an aspect, the URLLC indicator 1108 may be sent in a URLLC indicator channel with DMRS (e.g., in resource blocks 1114). In an aspect, a wireless communication device may check to determine whether certain tones contain a DMRS pattern. Certain tones containing a DMRS pattern may indicate that the URLLC data is present. In an aspect, the URLLC data punctures eMBB data in the PDSCH.

Figure 16:
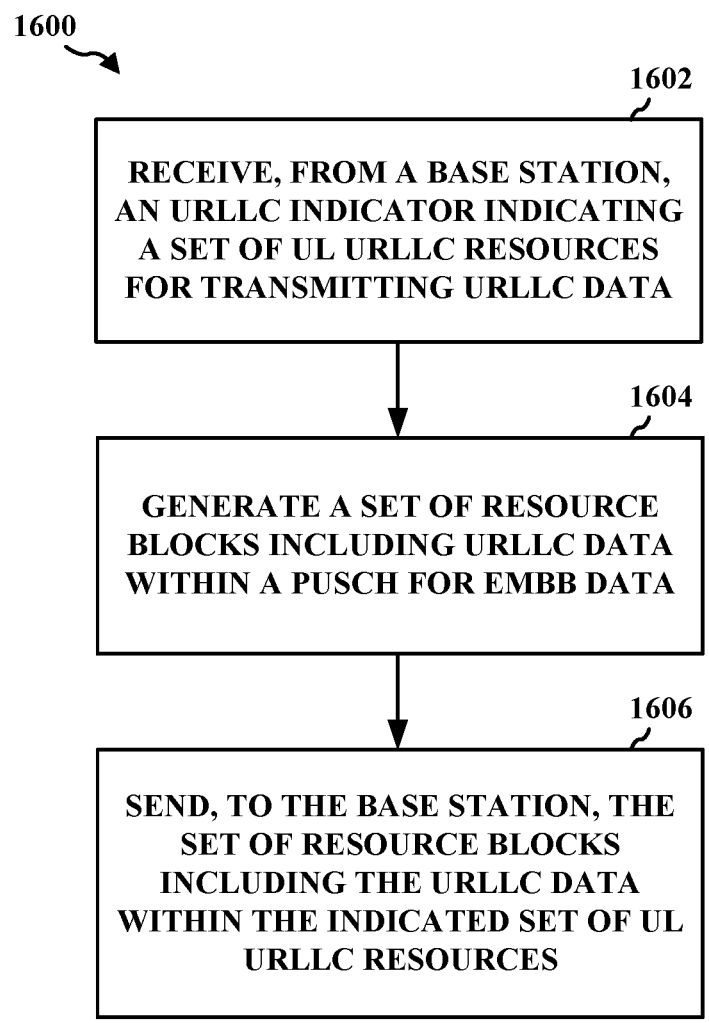
FIG. 16 is a flowchart of a method of wireless communication.

FIG. 16 is a flowchart 1600 of a method of wireless communication. The method may be performed by a UE (e.g., the UE 104, 350, 404, the apparatus 2002, 2002'). At 1602 a UE receives, from a base station, a URLLC indicator indicating a set of UL URLLC resources for transmitting URLLC data. For example, the UE 104, 350, 404, (e.g., apparatus 2002, 2002') may receive, from the base station 102, 310, 402, 1802, 1802', a URLLC indicator 1008 indicating a set of UL URLLC resources for transmitting URLLC data 1006, as described in connection with the example of FIG. 10.

At 1604, the UE generates a set of resource blocks including URLLC data. For example, the UE 104, 350, 404 may generate a set of resource blocks including URLLC data 1006, as described in connection with the example of FIG. 10.

At 1606, the UE sends, to the base station, the set of resource blocks including the URLLC data within the indicated set of UL URLLC resources. For example, the UE 104, 350, 404 sends, to the base station 102, 310, 402, the set of resource blocks including the URLLC data 1006 within the indicated set of UL URLLC resources. (See FIG. 10.) In some aspects, an indicator may be sent regardless of the presence of URLLC data. For example, a URLLC indicator may be sent periodically. In other aspects, a URLLC indicator may be sent only when URLLC data is present.

In an aspect, the URLLC indicator 1008 may be frequency division multiplexed with a PDSCH 1004. (See FIG. 10.)

In an aspect, the URLLC indicator 1008 may be frequency division multiplexed with a PDCCH 1110. (See FIG. 10.)

In an aspect, the URLLC indicator 1008 does not overlap with the PDCCH.

In an aspect, the URLLC indicator 1008 may be frequency division multiplexed with a PDCCH 1010 in the subset of the set of resource blocks and/or frequency division multiplexed with a PDSCH 1004 in the subset of the set of resource blocks.

In an aspect, the URLLC indicator 1008 may be embedded in the URLLC data 1006 (1014).

In an aspect, the URLLC indicator 1008 and the URLLC data 1006 may have a comb subcarrier structure.

In an aspect, the URLLC indicator 1008 may be received in a URLLC indicator channel with DMRS. In an aspect, a wireless communication device may check to determine whether certain tones contain a DMRS pattern. Certain tones containing a DMRS pattern may indicate that the URLLC data is present. In an aspect, the URLLC data punctures eMBB data in the PDSCH.

Figure 17:
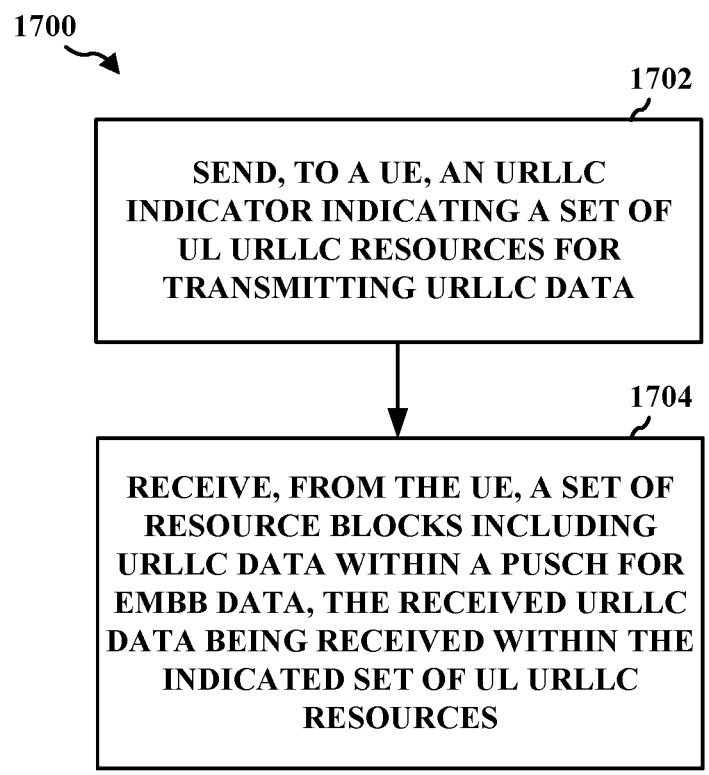
FIG. 17 is a flowchart of a method of wireless communication.

FIG. 17 is a flowchart 1700 of a method of wireless communication. The method may be performed by a base station (e.g., the base station 102, 310, 402, the apparatus 1802, 1802'). At 1702, a base station sends, to a UE, a URLLC indicator indicating a set of UL URLLC resources for transmitting URLLC data. For example, the base station 102, 310, 402, 1802, 1802' sends, to a UE 104, 350, 404, the apparatus 2002, 2002', a URLLC indicator 608 indicating a set of UL URLLC resources for transmitting URLLC data 1006. (See FIG. 10.)

At 1704, the base station receives, from the UE, a set of resource blocks including URLLC data, the received URLLC data being received within the indicated set of UL URLLC resources. For example, the base station 102, 310, 402, 1802, 1802' receives, from the UE 104, 350, 404, (e.g., apparatus 2002, 2002') a set of resource blocks including URLLC data 1006. The received URLLC data 1006 may be received within the indicated set of UL URLLC resources. (See FIG. 10.) In some aspects, an indicator may be received regardless of the presence of URLLC data. For example, a URLLC indicator may be received periodically. In other aspects, a URLLC indicator may be received only when URLLC data is present.

In an aspect, the URLLC indicator 1008 does not overlap with the eMBB data 1002 (1016).

In an aspect, the URLLC indicator 1008 may indicate to the at least one UE 104, 350, 404 that the URLLC data 1006 is within at least one of a set of symbols or a set of subcarriers of the set of resource blocks.

In an aspect, the URLLC indicator 1008 may be frequency division multiplexed with a PDCCH 1010 in the subset of the set of resource blocks and/or frequency division multiplexed with a PDSCH 1004 in the subset of the set of resource blocks.

In an aspect, the URLLC indicator 1008 may be embedded in the URLLC data 1006.

In an aspect, the URLLC indicator 1008 and the URLLC data 1006 may have a comb subcarrier structure.

In an aspect, the URLLC indicator 1008 may be sent in a URLLC indicator channel with DMRS. In an aspect, a wireless communication device may check to determine whether certain tones contain a DMRS pattern. Certain tones containing a DMRS pattern may indicate that the URLLC data is present. In an aspect, the URLLC data punctures eMBB data in the PDSCH.

Figure 18:
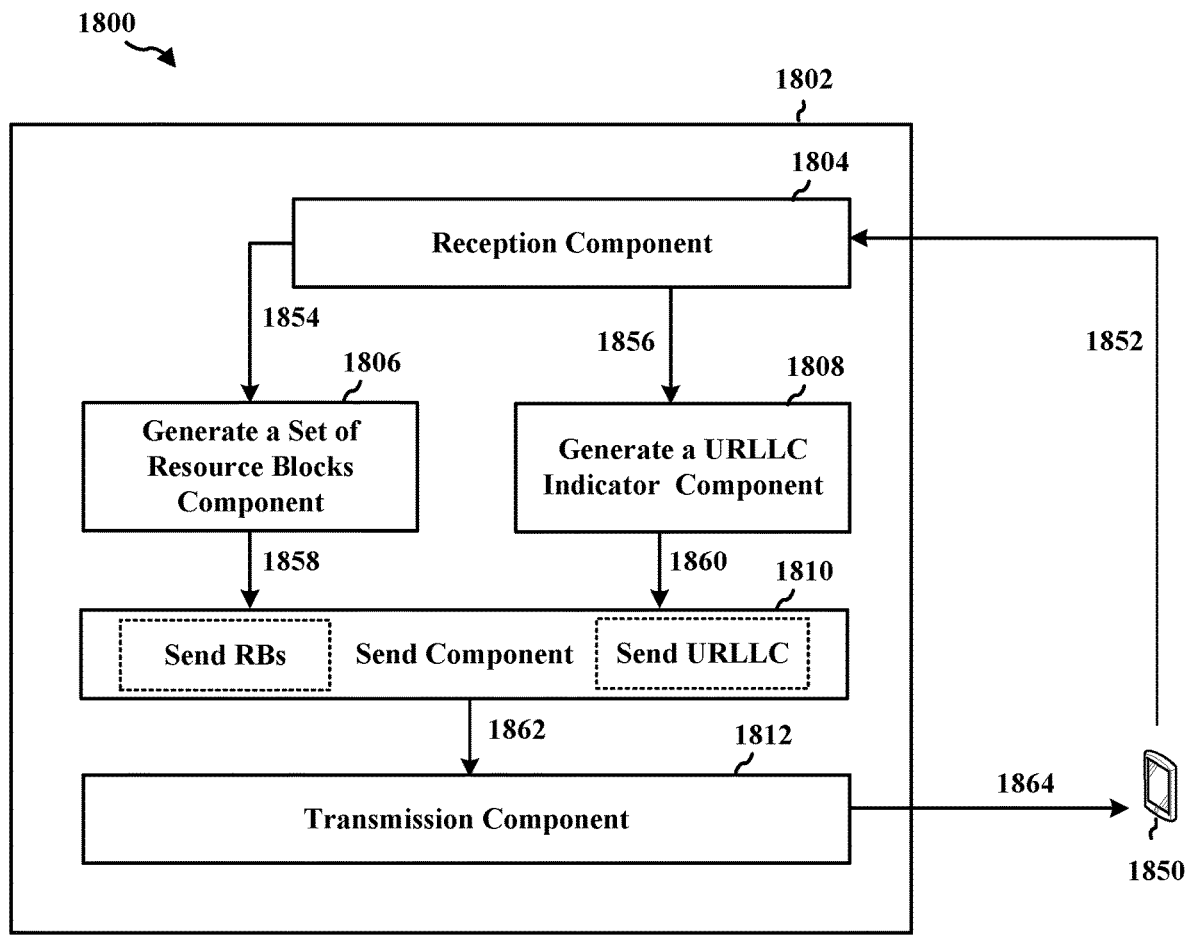
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station (e.g., base station 102, 180, 310, 402). The apparatus includes a component 1804 that that receives signals 1852 from a UE 1850 (e.g., UE 104, 350, 404, the apparatus 2002, 2002'), a component 1806 that generates a set of resource blocks including at least one of eMBB data 602 or URLLC data 606 in a PDSCH 604. The URLLC data 606 may be one of embedded in the eMBB data 602 or unembedded in the eMBB data 602 based on the signals 1854, a component 1808 that generates a URLLC indicator 608 indicating whether the set of resource blocks includes the URLLC data 606 based on received signals 1856, a component 1810 that sends, to at least one UE 104, 350, 404, the URLLC indicator 608 and the set of resource blocks including the at least one of the eMBB data 602 or the URLLC data 606, the URLLC indicator 608 being sent embedded within the URLLC data 606 or being sent separate from the URLLC data 606 within DCI of a PDCCH. In an aspect, the URLLC indicator 608 may be within a separate indicator channel, and a component 1812 that transmits signals 1864 based on signals 1862 from the control component 1810.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
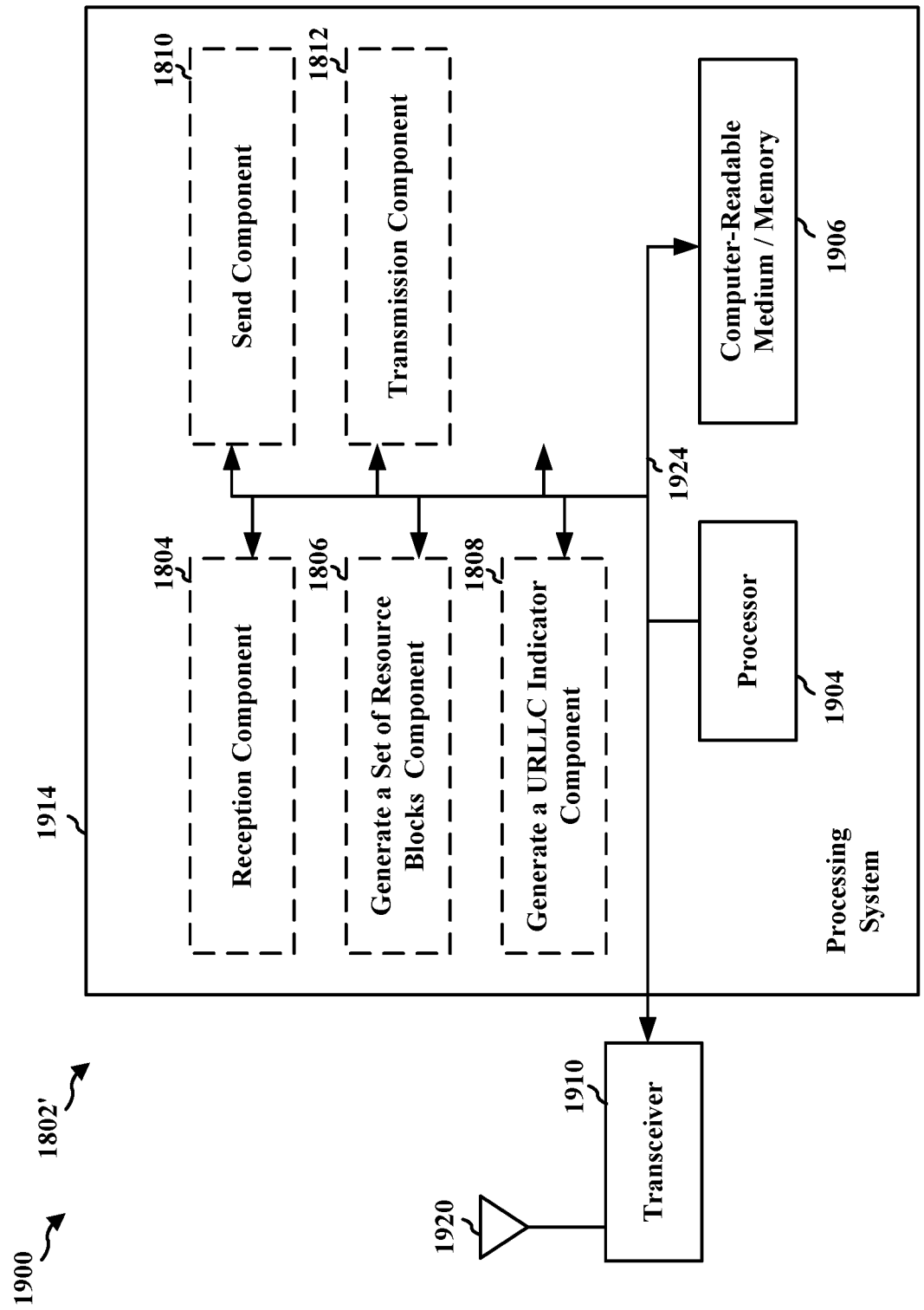
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1812, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375.

In one configuration, the apparatus 1802/1802' for wireless communication includes means for generating a set of resource blocks including at least one of eMBB data or URLLC data in a PDSCH. The URLLC data may be one of embedded in the eMBB data or unembedded in the eMBB data, means for generating a URLLC indicator indicating whether the set of resource blocks includes the URLLC data, a means for sending, to at least one UE, the URLLC indicator and the set of resource blocks including the at least one of the eMBB data or the URLLC data, the URLLC indicator being sent embedded within the URLLC data or being sent separate from the URLLC data within downlink control information (DCI) of a physical downlink control channel (PDCCH). In an aspect, the URLLC indicator 608 may be within a separate indicator channel. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
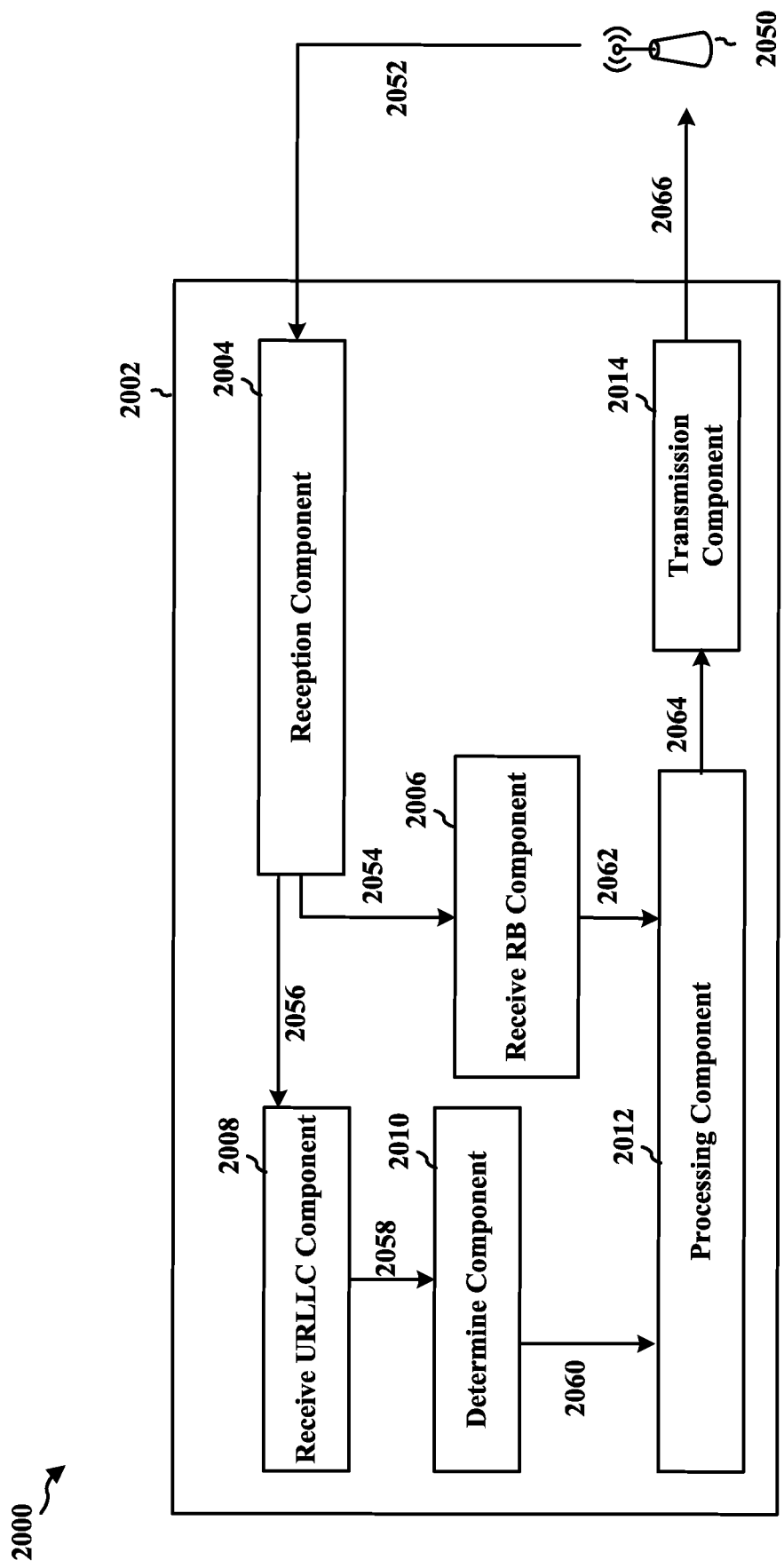
FIG. 20 is a conceptual data flow diagram illustrating the data flow between different means/components in an exemplary apparatus.

FIG. 20 is a conceptual data flow diagram 2000 illustrating the data flow between different means/components in an exemplary apparatus 2002. The apparatus may be a UE (e.g., UE 104, 350, 404). The apparatus includes a component 2004 that receives signals 2052 from the base station 2050 (e.g., base station 102, 180, 310, 402, the apparatus 1802, 1802'), a component 2006 that receives a set of resource blocks from a base station 102, 310, 402 including at least one of eMBB data or URLLC data in a PDSCH, a component 2008 that receive a URLLC indicator 608 from the base station 102, 310, 402, the URLLC indicator 608 being received embedded within the URLLC data 606 or being received separate from the URLLC data 606 within DCI of a PDCCH. In an aspect, the URLLC indicator 608 may be within a separate indicator channel, the URLLC indicator 608 indicating whether the set of resource blocks includes the URLLC data 606. The URLLC data 606 may be embedded in eMBB data 602 or unembedded in eMBB data 602, a component 2010 that determines, based on the URLLC indicator 608, whether the set of resource blocks includes the URLLC data 606. The determination 2060 from the determine component 2010 and the received resource blocks 2062 may be passed to the processing component 2012 which may processes, based on the URLLC indicator 608, the received set of resource blocks including the at least one of the eMBB data 602 or the URLLC data 606. The processing component 2012 may further control transmissions 2066 to the base station 2050 using a transmission control signal 2064.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
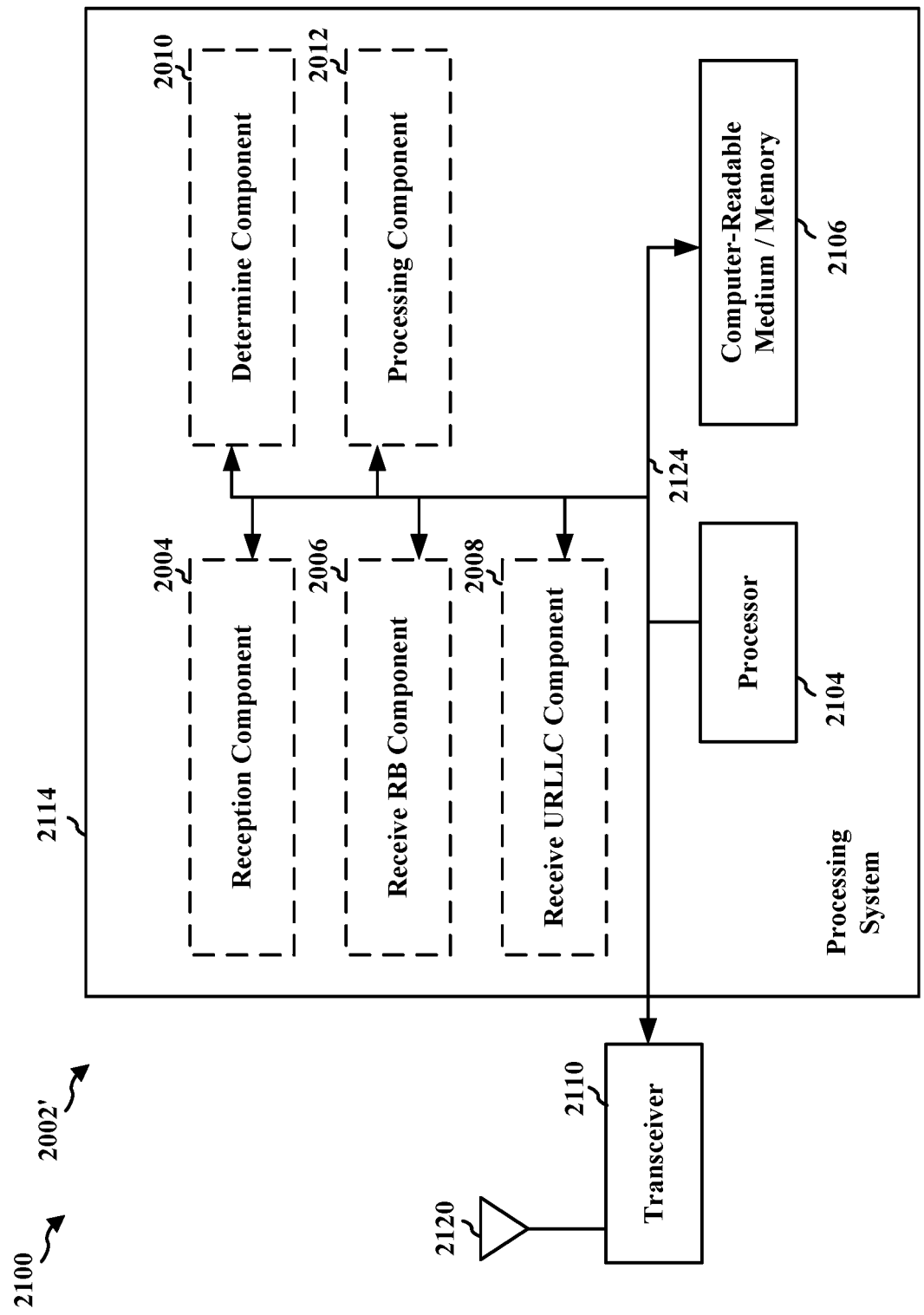
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2014, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, and 2014. The components may be software components running in the processor 2104, resident/stored in the computer readable medium/memory 2106, one or more hardware components coupled to the processor 2104, or some combination thereof. The processing system 2114 may be a component of the UE 350 and may include the memory 360 and/or at least one of the TX processor 368, the RX processor 356, and the controller/processor 359.

In one configuration, the apparatus 2002/2002' for wireless communication may include means for receiving a set of resource blocks from a base station includes at least one of eMBB data or URLLC data in a PDSCH, means for receiving a URLLC indicator from the base station, the URLLC indicator being received embedded within the URLLC data or being received separate from the URLLC data within DCI of a PDCCH. In an aspect, the URLLC indicator 608 may be within a separate indicator channel, the URLLC indicator indicating whether the set of resource blocks includes the URLLC data. The URLLC data may be embedded in eMBB data or unembedded in eMBB data, means for determining, based on the URLLC indicator, whether the set of resource blocks includes the URLLC data, and means for processing, based on the URLLC indicator, the received set of resource blocks including the at least one of the eMBB data or the URLLC data.

The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 22:
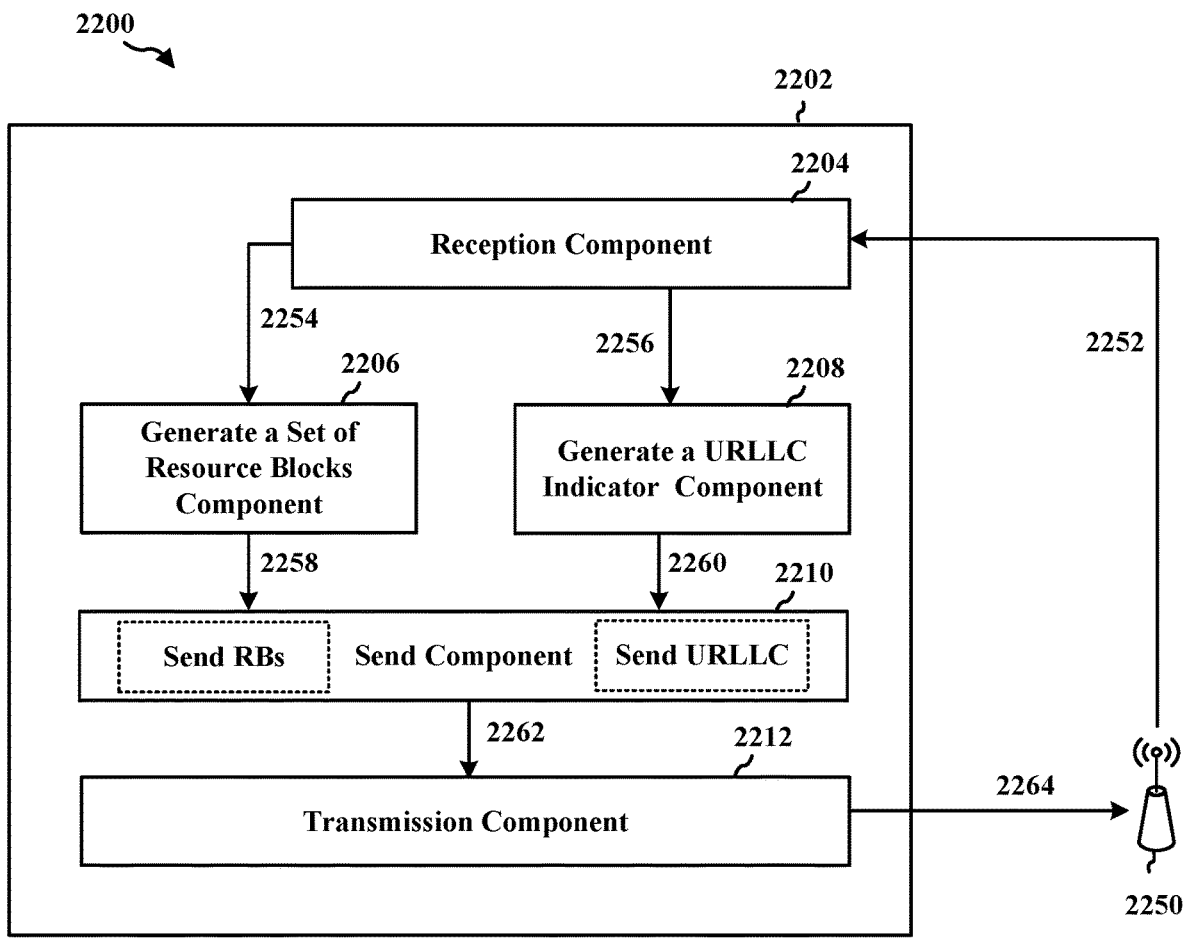
FIG. 22 is a conceptual data flow diagram illustrating the data flow between different means/components in an exemplary apparatus.

FIG. 22 is a conceptual data flow diagram 2200 illustrating the data flow between different means/components in an exemplary apparatus 2202. The apparatus may be a UE (e.g., UE 104, 350, 404, the apparatus 2202, 2202'). The apparatus includes a component 2204 that that receives signals 2252 from a base station 2250 (e.g., base station 102, 180, 310, 402, the apparatus 2402, 2402'), a component 2206 that generates a set of resource blocks including URLLC data based on the signals 2254, a component 2208 that generates generating a URLLC indicator indicating that the URLLC data is in a subset of the set of resource blocks based on received signals 2256, a component 1810 that sends, to a base station, the URLLC indicator and the set of resource blocks including the URLLC data 2258 using signal 2262 and through transmission component 2212 which transmits to the base station using signal 2264.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
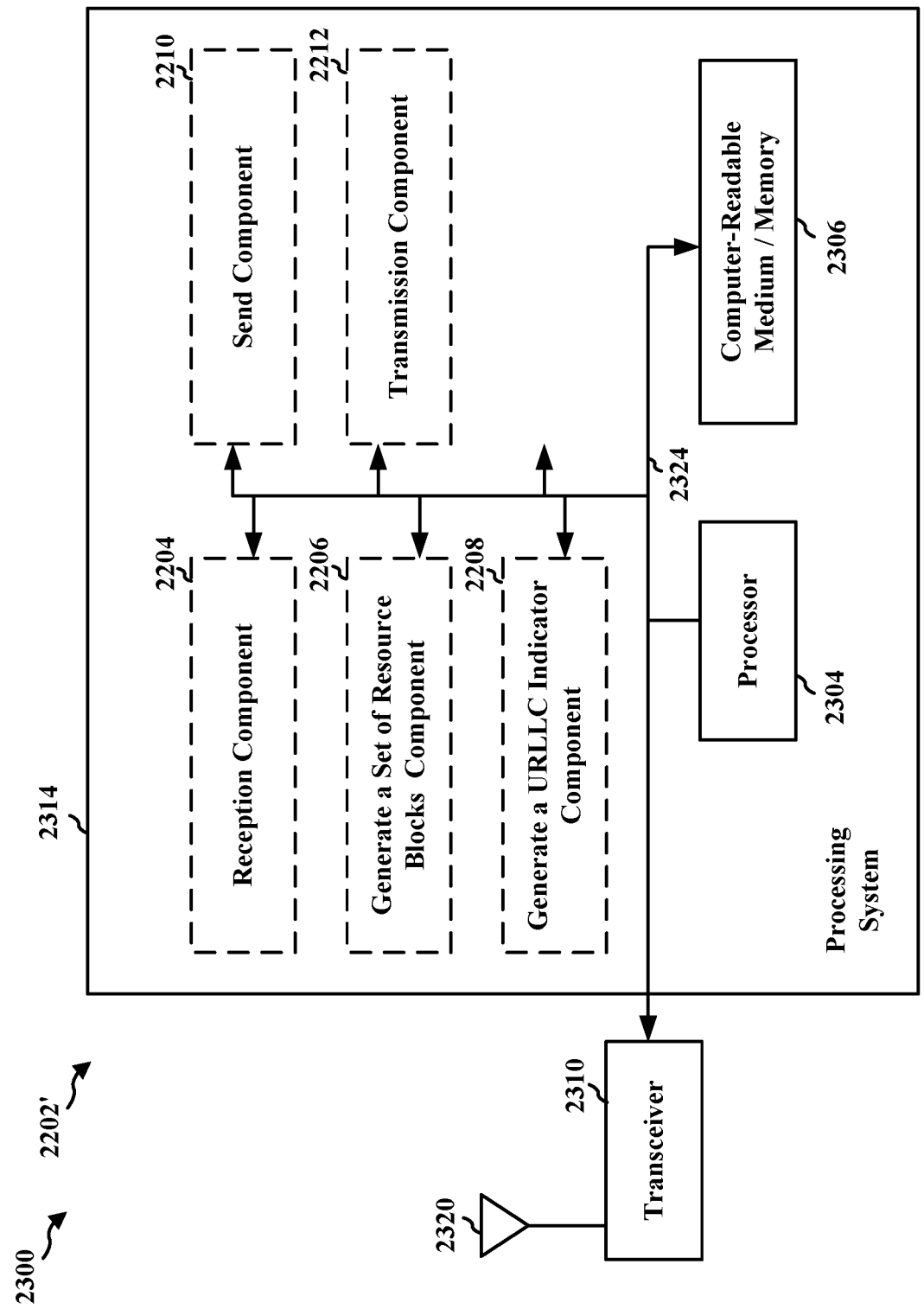
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2212, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2210, 2212. The components may be software components running in the processor 2304, resident/stored in the computer readable medium/memory 2306, one or more hardware components coupled to the processor 2304, or some combination thereof. The processing system 2314 may be a component of the UE 350 and may include the memory 360 and/or at least one of the TX processor 368, the RX processor 356, and the controller/processor 359.

In one configuration, the apparatus 2202/2202' for wireless communication includes means for means for generating a set of resource blocks including URLLC data, means for generating a URLLC indicator indicating that the URLLC data is in a subset of the set of resource blocks, and means for sending, to a base station, the URLLC indicator and the set of resource blocks including the URLLC data. The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 24:
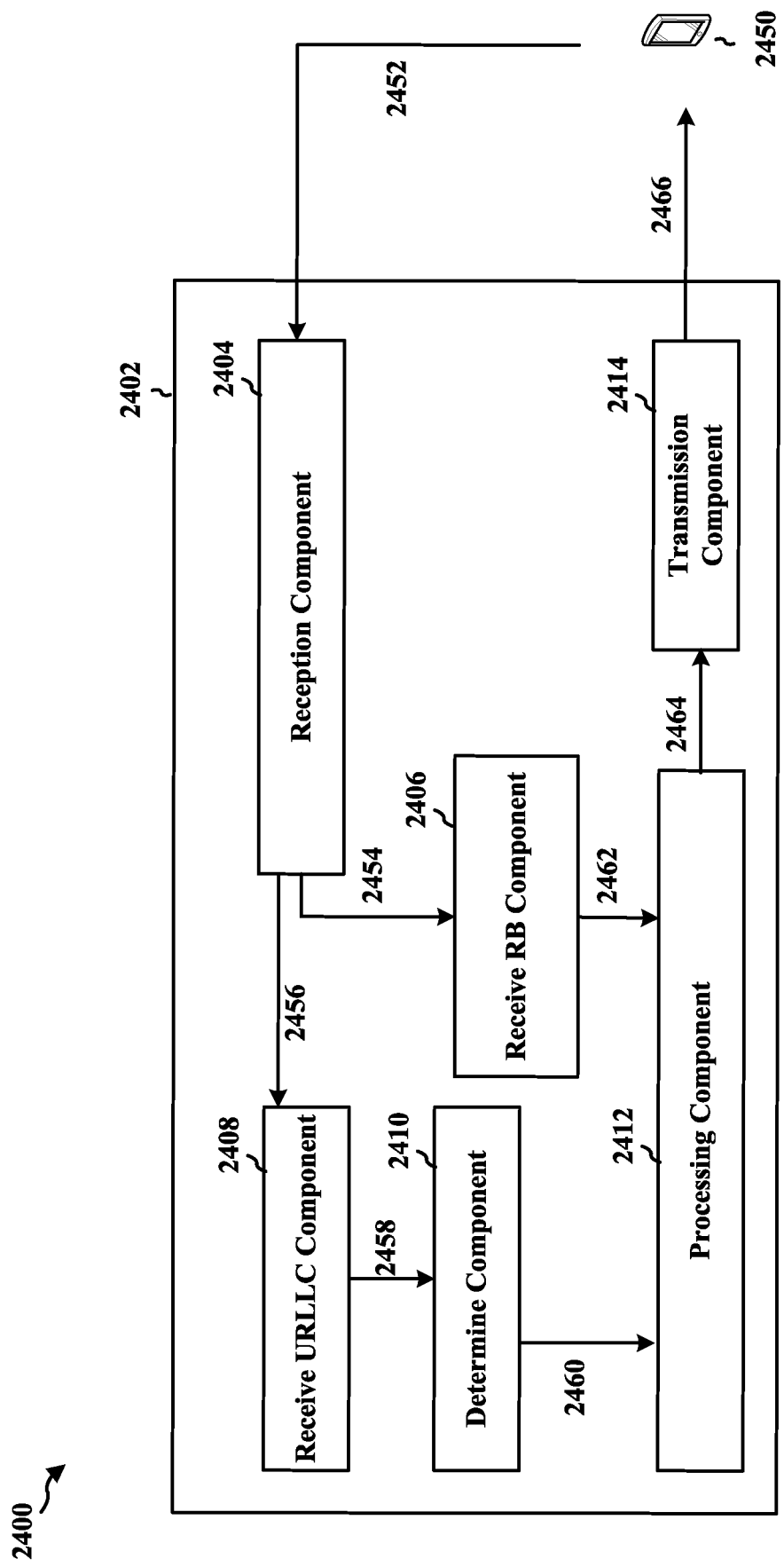
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus may be a base station (e.g., base station 102, 180, 310, 402, the apparatus 2402, 2402'). The apparatus includes a component 2404 that receives signals 2452 from a UE 2450 (e.g., UE 104, 350, 404, the apparatus 2402, 2402'), a component 2406 that that receives a set of resource blocks 2454 from a UE, a component 2408 that receives a URLLC indicator 2456 from the UE, a component 2410 that determines, based on the URLLC indicator 2058, that the set of resource blocks includes URLLC data. The determination 2460 from the determine component 2410 and the received resource blocks 2462 may be passed to the processing component 2412 which may control transmissions 2466 to the UE 2450 using a transmission control signal 2464.

The apparatus may include additional components that perform each of the blocks of the algorithm in the aforementioned flowcharts of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
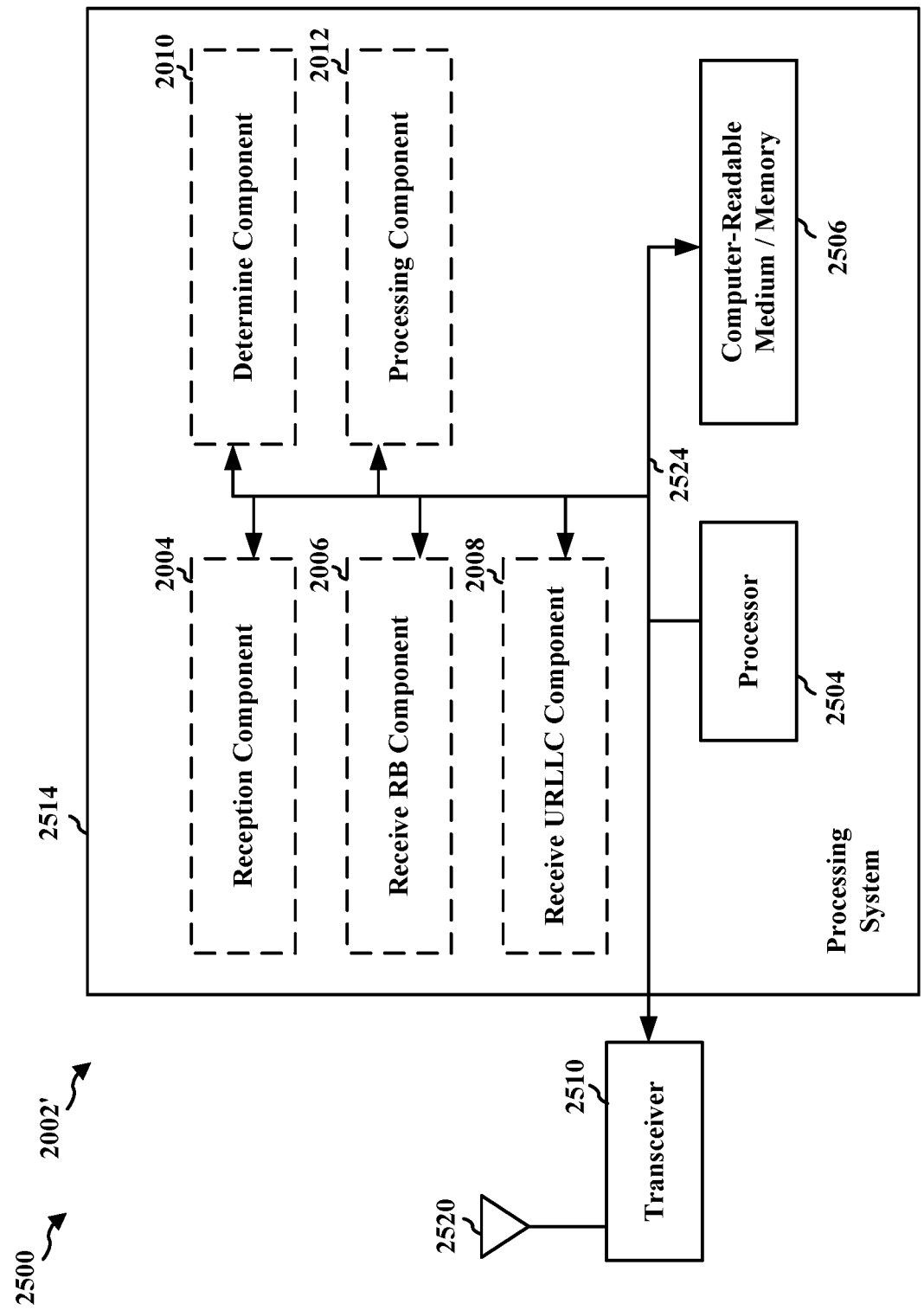
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410, 2412, 2414 and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2414, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408, 2410, 2412, 2414. The components may be software components running in the processor 2504, resident/stored in the computer readable medium/memory 2506, one or more hardware components coupled to the processor 2504, or some combination thereof. The processing system 2514 may be a component of the base station 310 and may include the memory 376 and/or at least one of the TX processor 316, the RX processor 370, and the controller/processor 375.

In one configuration, the apparatus 2402/2402' for wireless communication includes means for means for receiving a set of resource blocks from a user equipment (UE), means for receiving a URLLC indicator from the UE, and mans for determining, based on the URLLC indicator, that a subset of the set of resource blocks includes URLLC data. The aforementioned means may be one or more of the aforementioned components of the apparatus 2402 and/or the processing system 2514 of the apparatus 2402' configured to perform the functions recited by the aforementioned means. As described supra, the processing system 2514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As described herein, various aspects relate to uplink or downlink indications. The uplink or downlink indications may be URLLC indications, i.e., a URLLC indicator. Accordingly, in some aspects, the URLLC indicator may be an uplink URLLC indicator and in other aspects, the URLLC indicator may be a downlink URLLC indicator. The downlink indicator may be transmitted from a base station to a UE. The uplink indicator may be transmitted from a UE to a base station. In an aspect, a downlink indicator may be in DCI. A downlink indicator may be a post indication, e.g., indicating in a subsequent slot whether the URLCC data is present or not. Additionally, a downlink indicator may be configured to be a wideband indication or a sub-band indication (e.g., up to 2 sub-bands) indication. Furthermore, a downlink indicator may be configured to indicate one or more symbols by configuring the monitoring periodicity. In an aspect, a uplink indicator may use one or more of the formats described herein with respect to downlink indicators. FIGS. 5 to 11 may provide various formats that may be used with respect to uplink or downlink indications. In some aspects, downlink indications may relate to one or more aspects of FIG. 8.

In an aspect, a URLLC and an eMBB may be transmitted based on different transmission duration. For example, eMBB long (slot based) or URLLC short (mini-slot based).

Dynamic resource sharing between URLLC and eMBB may be supported.

In an aspect, URLLC may be pre-empted/puncture resource occupied by on-going eMBB.

In an aspect, URLLC an indication may be supported.

In an aspect, an indication of URLLC preemption may be sent to eMBB UE regarding the impacted eMBB resource to facilitate eMBB UE demodulation and decoding of the current transmission and subsequent retransmissions.

In an aspect, an indication channel may use a current indication (e.g., current with respect to URLLC traffic). In an aspect, an indication channel may use post indication.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In an aspect, an apparatus for wireless communication, may include a memory and at least one processor coupled to the memory and configured to receive a set of resource blocks from a base station includes at least one of eMBB data or URLLC data in a PDSCH, receive a URLLC indicator from the base station, the URLLC indicator being received embedded within the URLLC data or being received separate from the URLLC data within DCI of a PDCCH. In an aspect, the URLLC indicator 608 may be within a separate indicator channel, the URLLC indicator indicating whether the set of resource blocks includes the URLLC data. The URLLC data may be embedded in eMBB data or unembedded in eMBB data, determine, based on the URLLC indicator, whether the set of resource blocks includes the URLLC data, and processing the set of resource blocks based on a result of determining whether the set of resource blocks includes the URLLC data.

In an aspect, an apparatus for wireless communication, may include a memory and at least one processor coupled to the memory and configured to generate a set of resource blocks including at least one of eMBB data or URLLC data in a PDSCH. The URLLC data may be one of embedded in the eMBB data or unembedded in the eMBB data, generate a URLLC indicator indicating whether the set of resource blocks includes the URLLC data, and send, to at least one UE, the URLLC indicator and the set of resource blocks including the at least one of the eMBB data or the URLLC data, the URLLC indicator being sent embedded within the URLLC data or being sent separate from the URLLC data within DCI of a PDCCH. In an aspect, the URLLC indicator 608 may be within a separate indicator channel.

In an aspect, the URLLC indicator may indicate whether the set of resource blocks includes the at least part of the URLLC data. The URLLC data may be at least partially embedded in eMBB data or unembedded in eMBB data. The UE may be configured to determine, based on the URLLC indicator, whether the set of resource blocks includes at least part of the URLLC data.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   monitoring for a preemption indication based on a downlink configuration, the downlink configuration indicating whether or not the preemption indication identifies preemption in a data space in terms of a band or a sub-band;
   receiving, from a base station at a first time on shared downlink resources, a data transmission comprising first data associated with a first type of wireless communication;
   receiving, from the base station at a second time subsequent to the first time, the preemption indication in a group common physical downlink control channel (PDCCH);
   determining, based on the preemption indication and the downlink configuration, whether at least a portion of the shared downlink resources occupied by the first data is preempted for use by the UE, the preemption comprising second data associated with a second type of wireless communication different from the first type of wireless communication puncturing resources occupied by the first data within the data transmission; and
   decoding the first data when the portion of the shared downlink resources is not preempted by the second data.

2. The method of claim 1, further comprising refraining from decoding at least a portion of the first data that occupies resources corresponding to the portion of the shared downlink resources when the portion of the shared downlink resources is preempted by the second data.

3. The method of claim 1, wherein the shared downlink resources includes a first portion that is preempted by the second data and a second portion that is not preempted by the second data, further comprising:
   refraining from decoding a first portion of the first data that occupies resources corresponding to the first portion of the shared downlink resources that is preempted; and
   decoding a second portion of the first data that occupies resources corresponding to the second portion of the shared downlink resources that is not preempted.

4. The method of claim 1, wherein the first data associated with the first type of wireless communication corresponds to enhanced mobile broadband (eMBB) data and the second data associated with the second type of wireless communication corresponds to ultra-reliable low-latency communication (URLLC) data.

5. The method of claim 1, wherein the group common PDCCH includes downlink control information (DCI), wherein the receiving the preemption indication comprises receiving the preemption indication in at least a portion of the DCI.

6. The method of claim 1, wherein the preemption indication occupies one or more symbols in a mini-slot.

7. The method of claim 1, wherein the preemption indication occupies one or more symbols at every predetermined number of mini-slots.

8. The method of claim 1, wherein the preemption indication is included in the group common PDCCH across a full bandwidth.

9. The method of claim 1, wherein the preemption indication is included in the group common PDCCH across one or more sub-bands of a bandwidth.

10. The method of claim 1, wherein the downlink configuration indicates a periodicity of the preemption indication.

11. The method of claim 1, further comprising receiving, from the base station, the downlink configuration, dynamically, via downlink control information (DCI) signaling.

12. The method of claim 1, further comprising receiving, from the base station, the downlink configuration, semi-statically, via radio resource control (RRC) signaling.

13. The method of claim 1, wherein receiving the data transmission comprises receiving a first subframe that includes the data transmission, wherein the receiving the preemption indication comprises receiving a second subframe that follows the first subframe, further comprising transmitting, to the base station, an uplink short burst (ULSB) that is located between the first subframe and the second subframe.

14. The method of claim 1, wherein the receiving the data transmission comprises receiving, from the base station, a physical downlink shared channel (PDSCH) that includes the data transmission in at least a portion of the PDSCH, wherein the first data and the second data coexist within the at least the portion of the PDSCH, and wherein the data space corresponds to the PDSCH.

15. The method of claim 14, wherein the second data occupies resources that puncture one or more time resources occupied by the first data within the shared downlink resources at a preconfigured granularity according to the downlink configuration.

16. The method of claim 14, wherein the second data occupies resources that puncture one or more frequency resources occupied by the first data within the shared downlink resources at a preconfigured granularity according to the downlink configuration.

17. The method of claim 14, wherein the downlink configuration indicates that the preemption indication is separate from the data transmission within the PDSCH.

18. The method of claim 1, wherein the downlink configuration indicates how granular the preemption indication identifies the preemption in the data space in terms of resources that are configurable at different granularities, and each of the different granularities corresponds to a different time resource size.

19. The method of claim 1, wherein the downlink configuration indicates how granular the preemption indication identifies the preemption in the data space in terms of resources that are configurable at different granularities, and each of the different granularities corresponds to a different frequency resource size.

20. The method of claim 14, wherein the downlink configuration indicates whether the preemption indication is embedded in the data transmission within the PDSCH.

21. An apparatus for wireless communication at a user equipment (UE), comprising:
a memory;
a transceiver; and
at least one processor coupled to the memory and the transceiver, the at least one processor being configured to execute instructions stored on the memory that cause the UE to:
monitor for a preemption indication based on a downlink configuration, the downlink configuration indicating whether or not the preemption indication identifies preemption in a data space in terms of a band or a sub-band;
receive, from a base station at a first time on shared downlink resources, via the transceiver, a data transmission comprising first data associated with a first type of wireless communication;
receive, from the base station at a second time subsequent to the first time, via the transceiver, the preemption indication in a group common physical downlink control channel (PDCCH);
determine, based on the preemption indication and the downlink configuration, whether at least a portion of the shared downlink resources occupied by the first data is preempted for use by the UE, the preemption comprising second data associated with a second type of wireless communication different from the first type of wireless communication puncturing resources occupied by the first data within the data transmission; and
decode the first data when the portion of the shared downlink resources is not preempted by the second data.

22. The apparatus of claim 21, further comprising refraining from decoding at least a portion of the first data that occupies resources corresponding to the portion of the shared downlink resources when the at least a portion of the shared downlink resources is preempted by the second data.

23. The apparatus of claim 21, wherein the shared downlink resources includes a first portion that is preempted by the second data and a second portion that is not preempted by the second data, further comprising:
refraining from decoding a first portion of the first data that occupies resources corresponding to the first portion of the shared downlink resources that is preempted; and
decoding a second portion of the first data that occupies resources corresponding to the second portion of the shared downlink resources that is not preempted.

24. The apparatus of claim 21, wherein the group common PDCCH includes downlink control information (DCI), wherein the receiving the preemption indication comprises receiving the preemption indication in at least a portion of the DCI.

25. A method of wireless communication at a base station, the method comprising:
transmitting, to one or more user equipment (UEs), a downlink configuration that indicates whether or not a preemption indication identifies preemption in a data space in terms of a band or a sub-band;
transmitting, to the one or more UEs at a first time on shared downlink resources, a data transmission comprising first data associated with a first type of wireless communication; and
transmitting, to the one or more UEs at a second time subsequent to the first time, the preemption indication in a group common physical downlink control channel (PDCCH), wherein the preemption indication indicates whether at least a portion of the shared downlink resources occupied by the first data is preempted for use by the one or more UEs, the preemption comprising second data associated with a second type of wireless communication different from the first type of wireless communication puncturing resources occupied by the first data within the data transmission.

26. The method of claim 25, wherein the group common PDCCH includes downlink control information (DCI), wherein the transmitting the preemption indication comprises transmitting the preemption indication in at least a portion of the DCI.

27. The method of claim 25, further comprising transmitting, to the one or more UEs, the downlink configuration, dynamically, via downlink control information (DCI) signaling.

28. The method of claim 25, further comprising transmitting, to the one or more UEs, the downlink configuration, semi-statically, via radio resource control (RRC) signaling.

29. The method of claim 25, wherein transmitting the data transmission comprises transmitting a first subframe that includes the data transmission, wherein the transmitting the preemption indication comprises transmitting a second subframe that follows the first subframe, further comprising receiving, from at least one of the one or more UEs, an uplink short burst (ULSB) that is located between the first subframe and the second subframe.

30. The method of claim 25, wherein the transmitting the data transmission comprises transmitting, to the one or more UEs, a physical downlink shared channel (PDSCH) that includes the data transmission in at least a portion of the PDSCH, wherein the first data and the second data coexist within the at least the portion of the PDSCH, and wherein the data space corresponds to the PDSCH.

31. An apparatus for wireless communication at a base station, comprising:
a memory;
a transceiver; and
at least one processor coupled to the memory and the transceiver, the at least one processor being configured to execute instructions stored on the memory that cause the base station to:
transmit, to one or more user equipment (UEs), via the transceiver, a downlink configuration that indicates whether or not a preemption indication identifies preemption in a data space in terms of a band or a sub-band;
transmit, to the one or more UEs at a first time on shared downlink resources, via the transceiver, a data transmission comprising first data associated with a first type of wireless communication; and
transmit, to the one or more UEs at a second time subsequent to the first time, via the transceiver, the preemption indication in a group common physical downlink control channel (PDCCH), wherein the preemption indication indicates whether at least a portion of the shared downlink resources occupied by the first data is preempted for use by the one or more UEs, the preemption comprising second data associated with a second type of wireless communication different from the first type of wireless communication puncturing resources occupied by the first data within the data transmission.

* * * * *